US012254402B2

(12) United States Patent
Sasaki et al.

(10) Patent No.: US 12,254,402 B2
(45) Date of Patent: Mar. 18, 2025

(54) OPTIMIZATION DEVICE, METHOD FOR CONTROLLING OPTIMIZATION DEVICE, AND COMPUTER-READABLE RECORDING MEDIUM RECORDING PROGRAM FOR CONTROLLING OPTIMIZATION DEVICE

(71) Applicant: FUJITSU LIMITED, Kawasaki (JP)

(72) Inventors: Masato Sasaki, Kawasaki (JP); Takeshi Mishina, Kawasaki (JP); Satoshi Matsuura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1087 days.

(21) Appl. No.: 17/160,480

(22) Filed: Jan. 28, 2021

(65) Prior Publication Data

US 2021/0150356 A1  May 20, 2021

Related U.S. Application Data

(63) Continuation of application No. PCT/JP2018/034122, filed on Sep. 14, 2018.

(51) Int. Cl.
*G06N 3/08* (2023.01)
*G06N 7/01* (2023.01)
*G06N 20/20* (2019.01)

(52) U.S. Cl.
CPC .................. *G06N 3/08* (2013.01); *G06N 7/01* (2023.01); *G06N 20/20* (2019.01)

(58) Field of Classification Search
CPC ............. G06N 3/08; G06N 20/20; G06N 7/01
See application file for complete search history.

(56) References Cited

U.S. PATENT DOCUMENTS

| 2016/0118106 A1 | 4/2016 | Yoshimura et al. |
| 2018/0005114 A1 | 1/2018 | Tomita et al. |

(Continued)

FOREIGN PATENT DOCUMENTS

| JP | H05-250346 A | 9/1993 |
| JP | H09-231197 A | 9/1997 |

(Continued)

OTHER PUBLICATIONS

Zhang, Li et al., "Salsa: Scalable Asynchronous Replica Exchange for Parallel Molecular Dynamics Applications", Proceedings of the 2006 International Conference on Parallel Processing 2006 (ICPP 2006), IEEE, PI, XP031016448, pp. 127-134, Aug. 1, 2006.

(Continued)

*Primary Examiner* — Casey R. Garner
(74) *Attorney, Agent, or Firm* — Fujitsu Intellectual Property Center

(57) ABSTRACT

An optimization device includes: a memory; and a processor configured to: perform, as annealing operations, a process including, with respect to a change in a value of any of state variables included in an evaluation function representing an energy, based on a change in the energy, determining which change of value of the state variables is accepted, and determining a value of each of the state variables; retain correspondence information in which identification information that identifies the annealing operations is arranged; cause start of the process by each of the annealing operations, determine whether or not to perform, when the processes by two of the annealing operations corresponding to two temperatures are completed, exchange of the temperatures assigned to the two annealing operations; update the correspondence information when performing the exchange; and supply temperature information representing the temperatures to the two annealing operations.

10 Claims, 17 Drawing Sheets

(56) References Cited

U.S. PATENT DOCUMENTS

2019/0130295 A1* 5/2019 Okuyama ............... G06F 17/11
2021/0350269 A1* 11/2021 King ..................... G06F 15/163

FOREIGN PATENT DOCUMENTS

JP          2018-5541 A1    1/2018
WO      2014/192153 A1   12/2014

OTHER PUBLICATIONS

Navarro, Cristobal A. et al., "Adaptive multi-GPU Exchange Monte Carlo for the 3D Random Field Ising Model", Computer Physics Communications, Elsevier Science Publishers B.V., Amsterdam, NL, vol. 205, XP029560587, pp. 48-60, Apr. 27, 2016.
Extended European Search Report dated Apr. 21, 2022 for corresponding European Patent Application No. 18933132.5, 7 pages.
Koji Fukushima(Hukushima), "Recent Developments in Markov-chain Monte Carlo Method", IEICE Technical Report, vol. 110, pp. 113-116, Jun. 7, 2010, The Institute of Electronics, Information and Communication Engineers (Total 6 pages) (Cited in ISR).
International Search Report and Written Opinion of the International Searching Authority (Form PCT/ISA/210, 220, and 237), mailed in connection with PCT/JP2018/034122 and mailed Dec. 18, 2018 (Total 10 pages).

* cited by examiner

FIG. 1
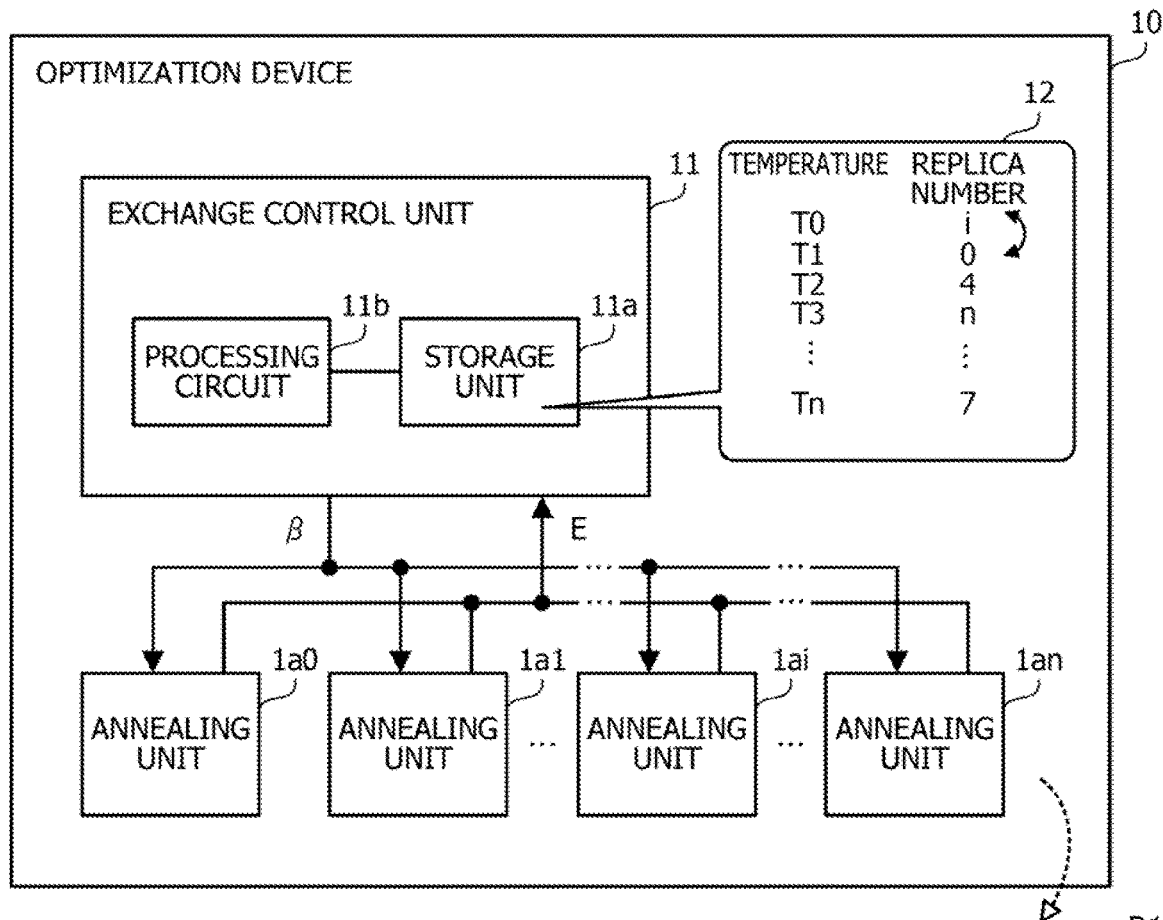
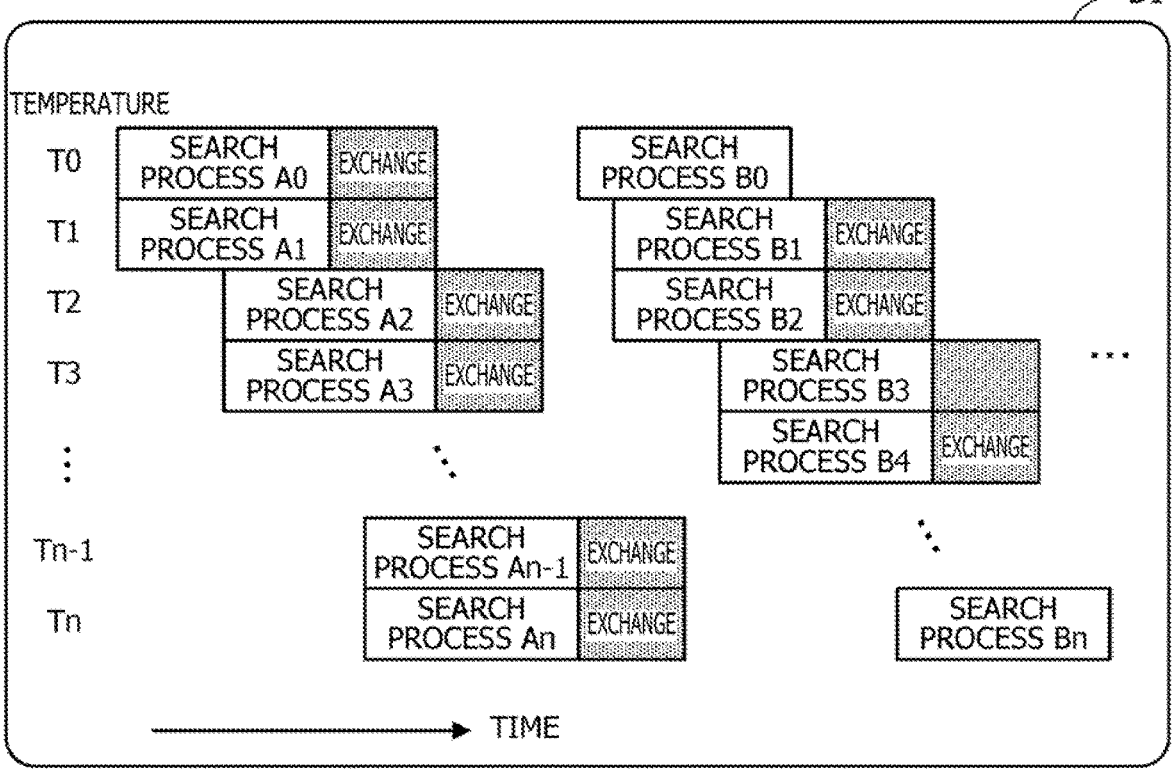

FIG. 7

FIRST CORRESPONDENCE INFORMATION 71

| TEMPERATURE NUMBER | REPLICA NUMBER |
|---|---|
| 0 | 6 |
| 1 | 8 |
| 2 | 14 |
| 3 | 3 |
| 4 | 1 |
| 5 | 0 |
| 6 | 2 |
| 7 | 9 |
| 8 | 15 |
| 9 | 4 |
| 10 | 13 |
| 11 | 11 |
| 12 | 5 |
| 13 | 12 |
| 14 | 10 |
| 15 | 7 |

FIG. 8

SECOND CORRESPONDENCE
INFORMATION
                                          72

| TEMPERATURE NUMBER | TEMPERATURE |
|---|---|
| 0 | T0 |
| 1 | T1 |
| 2 | T2 |
| 3 | T3 |
| 4 | T4 |
| 5 | T5 |
| 6 | T6 |
| 7 | T7 |
| 8 | T8 |
| 9 | T9 |
| 10 | T10 |
| 11 | T11 |
| 12 | T12 |
| 13 | T13 |
| 14 | T14 |
| 15 | T15 |

FIG. 17

| SECOND CORRESPONDENCE INFORMATION | 72 |
|---|---|
| TEMPERATURE NUMBER | TEMPERATURE ($\beta$) |
| 0 | 100 |
| 1 | 90 ⇒92 |
| 2 | 80 |
| 3 | 70 |
| 4 | 60 |
| 5 | 50 ⇒49 |
| 6 | 45 |
| 7 | 40 |
| 8 | 35 |
| 9 | 30 |
| 10 | 25 |
| 11 | 20 ⇒21 |
| 12 | 15 |
| 13 | 10 |
| 14 | 5 |
| 15 | 1 |

[T1]

⇒

| SECOND CORRESPONDENCE INFORMATION | 72a |
|---|---|
| TEMPERATURE NUMBER | TEMPERATURE ($\beta$) |
| 0 | 100 |
| 1 | 92 |
| 2 | 80 |
| 3 | 70 |
| 4 | 60 ⇒58 |
| 5 | 49 |
| 6 | 45 ⇒46 |
| 7 | 40 |
| 8 | 35 |
| 9 | 30 |
| 10 | 25 |
| 11 | 21 |
| 12 | 15 ⇒16 |
| 13 | 10 |
| 14 | 5 |
| 15 | 1 |

[T2]

⇒ ...

OPTIMIZATION DEVICE, METHOD FOR CONTROLLING OPTIMIZATION DEVICE, AND COMPUTER-READABLE RECORDING MEDIUM RECORDING PROGRAM FOR CONTROLLING OPTIMIZATION DEVICE

CROSS-REFERENCE TO RELATED APPLICATION

This application is a continuation application of International Application PCT/JP2018/034122 filed on Sep. 14, 2018 and designated the U.S., the entire contents of which are incorporated herein by reference.

FIELD

The present embodiment relates to an optimization device, a method for controlling the optimization device, and a program for controlling the optimization device.

BACKGROUND

As a method of solving a multivariable optimization problem that a von Neumann computer is not good at, there is an optimization device using an Ising energy function (sometimes referred to as an Ising machine or a Boltzmann machine). The optimization device calculates a problem to be calculated by replacing with an Ising model that is a model representing behavior of spins of magnetic material.

Related art is disclosed in Japanese Laid-open Patent Publication No. 2018-5541.

SUMMARY

According to an aspect of the embodiments, an optimization device includes: a memory; and a processor coupled to the memory and configured to: perform, as a plurality of annealing operations, a process including, with respect to a change in a value of any of a plurality of state variables included in an evaluation function representing an energy, based on a change in the energy accompanying a change in a value of each of the plurality of state variables and a temperature, probabilistically determining which change of value of the plurality of state variables is accepted, and determining a value of each of the plurality of state variables with respect to the temperature; retain correspondence information in which a plurality of pieces of identification information that identifies the plurality of annealing operations is arranged in ascending or descending order of the temperature assigned to each of the plurality of annealing operations; cause start of the process by each of the annealing operations associated with the temperature in the order of the temperature based on the correspondence information; determine whether or not to perform, when the processes by two of the annealing operations corresponding to two temperatures are completed, exchange of the temperatures assigned to the two annealing operations without waiting for completion of the processes by another annealing operations; update the correspondence information when performing the exchange; and supply temperature information representing the temperatures to the two annealing operations based on the correspondence information after the update.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating an optimization device according to a first embodiment.

FIG. 7 is a diagram illustrating an example of first correspondence information.

FIG. 8 is a diagram illustrating an example of second correspondence information.

FIG. 17 is a diagram illustrating an execution example of temperature adjustment.

DESCRIPTION OF EMBODIMENTS

Figure 2:
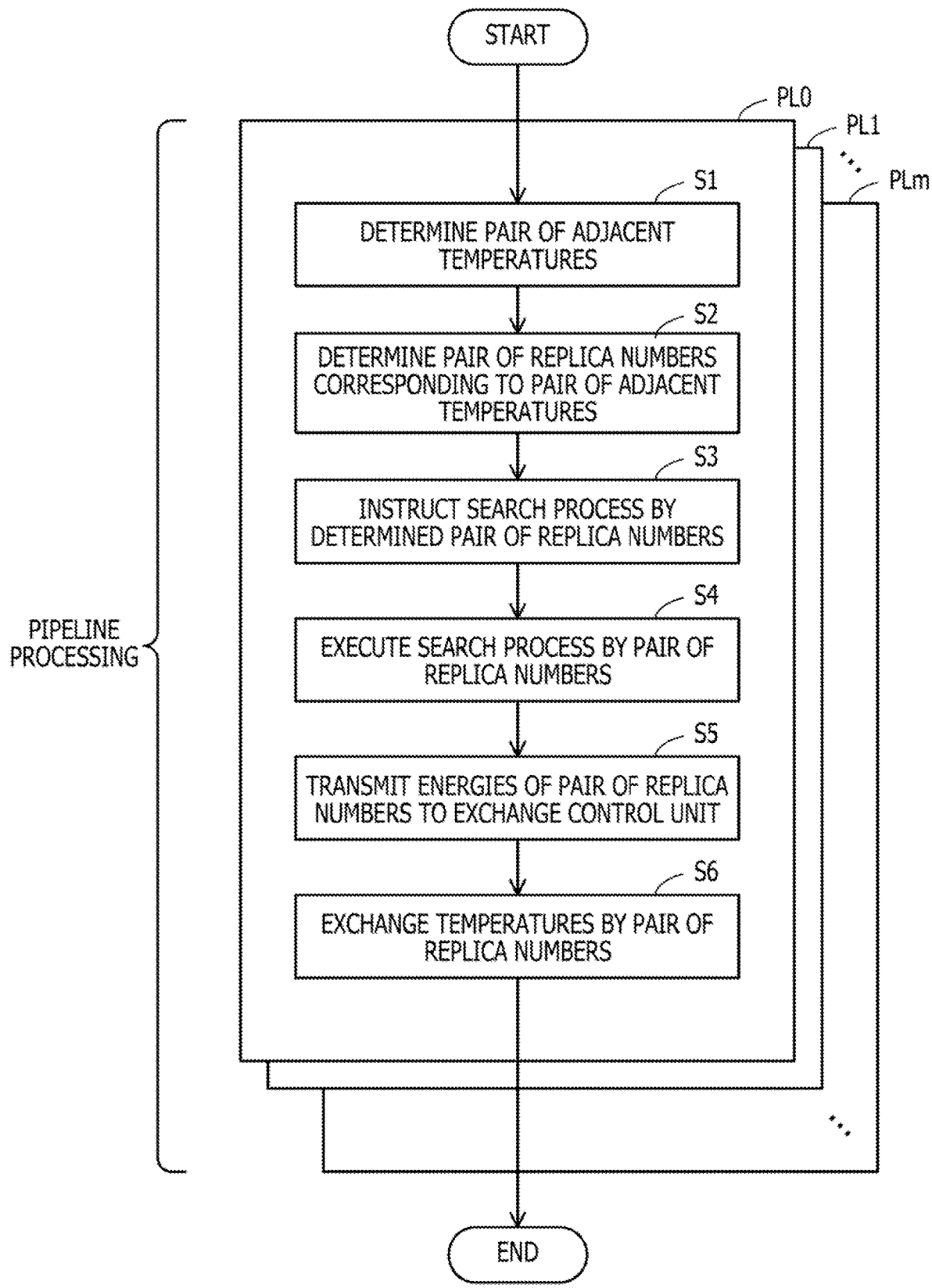
FIG. 2 is a flowchart illustrating a processing example of the optimization device.

The optimization device can also be modeled by using, for example, a neural network. In that case, each of a plurality of bits (spin bits) corresponding to a plurality of spins included in the Ising model functions as a neuron that outputs 0 or 1 depending on a weighting coefficient (also referred to as a coupling coefficient) indicating a magnitude of interaction between the bit itself and another bit. The optimization device obtains as a solution a combination of values of respective bits in which the minimum value is obtained of a value (hereinafter also referred to as energy) of an energy function as described above (also referred to as a cost function or an objective function), by a probabilistic search method such as simulated annealing, for example.

For example, an information processing device that performs a probabilistic search using a method called an extended ensemble method has been considered. The proposed information processing device performs a probabilistic search in a plurality of networks (called ensembles) in which different temperatures are set. The proposed information processing device exchanges the states of nodes of respective ensembles according to a difference in energy of the respective ensembles between ensembles in which temperatures are set adjacent to each other. Thus, falling into a local solution is prevented, and faster convergence to the optimum value is achieved.

The information processing device of the above proposal exchanges node states between ensembles after performing a probabilistic search process in all ensembles. While exchanging the node states, the operation may be delayed because the probabilistic search by each ensemble cannot be performed and the process waits.

In one aspect, an optimization device for accelerating operations, a method for controlling the optimization device, and a program for controlling the optimization device may be provided.

Hereinafter, the present embodiment will be described with reference to the drawings.

First Embodiment

A first embodiment will be described.

FIG. 1 is a diagram illustrating an optimization device according to the first embodiment.

An optimization device 10 searches for a solution to an optimization problem. It is known that among optimization problems, many of problems called discrete optimization problems, combinatorial optimization problems, and the like are very difficult to solve because variables take discrete values, not continuous values. The greatest reason that makes it difficult to solve a discrete optimization problem is that there are numerous states called local solutions, which are not optimum solutions but take minimum values in local neighborhoods.

There is no efficient general solution for solving discrete optimization problems. Accordingly, there is used an approximate solution method using a property peculiar to a problem, or a method called metaheuristic that does not rely much on a property of a problem.

The following description relates to a solution using a Markov chain Monte Carlo method of the latter, and particularly relates to, for example, simulated annealing in a broad sense called an exchange Monte Carlo method or a replica exchange method.

The simulated annealing is a method of determining an optimum solution by probabilistically changing a state (the value of a variable vector) using a random number. The following describes a problem of minimizing the value of an evaluation function to be optimized as an example. The value of the evaluation function is referred to as energy. For maximization, the sign of the evaluation function only needs to be changed.

It has been proved that in simulated annealing, by determining the acceptance (acceptable) probability of a state transition as following Equations (1), (2) using an energy change accompanying the transition and temperature, the state reaches an optimum solution in the limit of infinite times (iteration count).

[Equation 1]
$$p(\Delta E, T) = f\left(-\frac{\Delta E}{T}\right) \quad (1)$$

[Equation 2]
$$f^{met}(x) = \min(1, e^x) \quad (2)$$

Here, T is a parameter representing a temperature, and is desired to have an initial value that is sufficiently large according to a problem, and is reduced sufficiently slowly.

As described above, in the simulated annealing, the optimum solution can be obtained by taking an infinite iteration count. However, in reality, it is necessary to obtain a solution with a finite iteration count, and thus the optimum solution is not always obtained. In addition, since the temperature decreases very slowly as described above, the temperature does not sufficiently decrease in a finite time. Therefore, in actual simulated annealing, the temperature is often reduced faster than when the temperature is changed to ensure a theoretical convergence.

In actual simulated annealing, starting from an initial state, the above-described iteration is repeated while the temperature is reduced. When a completion determination condition such as reaching a certain iteration count or the energy falling below a certain value is satisfied, the operation is completed. An answer output is a state at the completion. However, since the temperature does not actually become zero at a finite iteration count, the occupancy probability of the state has a distribution represented by a Boltzmann distribution or the like even at the completion, and does not necessarily become an optimal value or a good solution. Thus, it is a practical solution to keep a state with the lowest energy obtained so far in the middle of iteration, and output it at the end.

As described above, the simulated annealing has a problem that a calculation time is relatively long because the temperature needs to be lowered slowly. Further, there is another problem that it is difficult to properly adjust the way of reducing temperature according to a problem. If temperature is reduced too slowly, the temperature does not decrease much in a finite time, so that the energy range of a final heat distribution becomes wide and thus the occupation probability of a good solution is not increased. On the other hand, if temperature is reduced too fast, the temperature decreases before escape from a local solution, and the calculation remains stuck in a bad solution, so that the probability of obtaining a good solution decreases.

A replica exchange method performs an operation to perform Monte Carlo searches (hereinafter referred to as "probabilistic searches") using a plurality of temperatures at the same time, compare the energies of states with respect to respective temperatures for every certain iteration count, and exchange states corresponding to two temperatures with an appropriate probability.

The optimization device 10 is, for example, a single-chip semiconductor integrated circuit and is implemented using a field programmable gate array (FPGA) or the like. The optimization device 10 has a plurality of annealing units (annealing units 1a0, 1a1, . . . , 1ai, . . . , 1an in FIG. 1) and an exchange control unit 11. Each of the annealing units 1a0, . . . , 1an is sometimes called a replica. Here, n is, for example, an odd number of one or more. n+1 indicates the number of annealing units of the optimization device 10. i is an integer of 0 or more and n or less. The exchange control unit 11 gives temperature information (hereinafter, the inverse temperature $\beta_i$ (the reciprocal of T)) to each of the annealing units 1a0, . . . , 1an.

The annealing unit 1ai probabilistically determines, with respect to a change in a value of any of a plurality of state variables included in an evaluation function representing an energy, based on a change in the energy accompanying a change in a value of each of the plurality of state variables and a temperature, which change of value of the plurality of state variables is accepted (probabilistic search). The annealing unit 1ai performs a process of determining the respective values of the plurality of state variables with respect to temperatures by repeating a probabilistic search a predetermined number of times.

Specifically, the annealing unit 1ai retains the values of a plurality of state variables included in the evaluation function. The annealing unit 1ai updates states $S_i$ that are the values of the plurality of state variables (the above-described values of variable vectors), based on a flag F indicating whether state transition is enabled or disabled, and the identification number (index) N of a state variable indicated by the flag F.

The annealing unit 1ai calculates energy changes accompanying changes in the state variables (state transitions). For example, a case is considered where the evaluation function is represented by an Ising model represented by connection between two state variables, and only one state variable transition is allowed at a time. In this case, the annealing unit 1ai calculates an energy change accompanying a change (state transition) of each of the plurality of state variables, based on the value of each state variable, a coupling coefficient indicating the strength of connection between the state variables, the identification number N, and the flag F. An energy change $\Delta E_{ik}$ indicates an energy change accompanying a change in a k-th state variable. Note that the value of the coupling coefficient corresponding to the optimization problem to be calculated is stored in advance in a memory, a register, or the like included in the optimization device 10.

When the evaluation function is not the Ising model, and when transitions of a plurality of state variables at a time are allowed, the numbers of the state transitions and the numbers of the changing state variables do not always match. However, it is only sufficient to properly calculate energy changes corresponding to the numbers of the state transitions. The functions of the annealing unit 1ai, which calculates the energy change by the evaluation function and determines whether state transition is enabled or disabled, are implemented by using a logic circuit such as a product-sum calculation circuit, for example.

The annealing unit 1ai performs a probabilistic search by determining an acceptance probability of the state transition of the k-th state variable by Equation (3) below, using the energy change $\Delta E_{ik}$ and the inverse temperature $\beta_i$ assigned by the exchange control unit 11.

[Equation 3]

$$p(\Delta E_{ik}, \beta_i) = f(-\beta_i \Delta E_{ik}) \qquad (3)$$

Note that in Equation (3), the function f is the same as that in Equation (1). For example, the function f of the Metropolis method in Equation (2) is used. Based on the acceptance probability of the state transition described above, the annealing unit 1ai changes the N-th state variable and updates the state $S_i$ using the flag F indicating whether state transition is enabled or disabled, and the N-th state transition (identification number of the state variable to be changed) indicated by the flag F. Furthermore, the annealing unit 1ai updates and outputs an energy $E_i$ based on the energy change $\Delta E_{iN}$. One process of the probabilistic search corresponds to a cycle of processes of determining the acceptance probability of the state transition of the k-th state variable, updating the state $S_i$ based on the acceptance probability, and updating the energy $E_i$.

The exchange control unit 11 observes energies F in each of the annealing units for every certain iteration count of the probabilistic search. Then, the exchange control unit 11 exchanges the temperatures supplied to the two annealing units (or the values of respective state variables in two of the annealing units), based on exchange probabilities $p_{ij}$ expressed by Equation (4) below, using the energies E and the inverse temperatures β in two of the annealing units 1a0, ..., 1an.

[Equation 4]

$$p_{ij} = f((\beta_i - \beta_j)(E_i - E_j)) \qquad (4)$$

Note that in Equation (4), $\beta_i$ is the inverse temperature provided to the annealing unit 1ai, $\beta_j$ is the inverse temperature provided to the j-th annealing unit that is not illustrated, $E_i$ is the energy in the annealing unit 1ai, and $E_j$ is the energy in the j-th annealing unit. Furthermore, in Equation (4), the function f is the same as that in Equation (1). For example, the function f of the Metropolis method in Equation (2) is used.

Even when such exchange is performed, the probability distribution of states at respective temperatures converges to a Boltzmann distribution with respect to the temperatures. Then, the relaxation time needed to converge to this distribution can be made significantly shorter than when no exchange is performed.

Note that for two annealing units for which an exchange is performed, those provided with temperatures relatively close to each other (for example, those provided with adjacent temperatures) are selected so that the exchange probability does not become too small.

The exchange control unit 11 has a storage unit 11a and a processing circuit 11b.

The storage unit 11a is a storage circuit such as a register, for example. The storage unit 11a may be a volatile memory such as a random access memory (RAM), or a non-volatile memory such as a flash memory or an electrically erasable programmable read only memory (EEPROM).

The storage unit 11a retains correspondence information 12. The correspondence information 12 indicates the correspondence relationship between the respective temperatures assigned to the annealing units 1a0, ..., 1an and identification information (called a replica number) that identifies each of the annealing units 1a0, ..., 1an, in which the replica numbers are arranged in ascending or descending order of temperature.

In the example of FIG. 1, the temperatures T0, T1, ..., Tn increase in the order of the temperatures T0, T1, ..., Tn. Therefore, in the example of FIG. 1, it can be said that the correspondence information 12 is such that the replica numbers are arranged in ascending order of temperature.

Note that the temperature may be represented not by the temperature itself but by information that identifies the temperature. In that case, the storage unit 11a retains other correspondence information indicating the correspondence relationship between information, which identifies temperatures, and the temperatures.

The processing circuit 11b causes start of a process by each of the annealing units 1a0, ..., 1an associated with temperatures in the order of the temperatures based on the correspondence information 12. When the processes by the two annealing units corresponding to two adjacent temperatures are completed, the processing circuit 11b determines whether or not to perform exchange of the temperatures assigned to the two annealing units without waiting for the completion of the processes by the other annealing units. When performing the exchange, the processing circuit 11b updates the correspondence information 12, and supplies the temperature information representing temperatures to the two annealing units based on the correspondence information 12 after update. In this manner, the processing circuit 11b controls pipeline processing including the determination of each state variable by each of the annealing units 1a0, . . . , 1an, and the replica exchange between two annealing units.

Next, the process by the processing circuit 11b will be illustrated. In the following, a process of determining the value of each state variable with respect to an assigned temperature by the probabilistic search with a certain iteration count may be referred to as a "search process". For example, each of the annealing units executes the search process by performing the probabilistic search up to the upper limit of the same iteration count using the temperature assigned to itself. A time needed for one search process by each of the annealing units 1a0, . . . , 1an is almost the same time. However, the upper limit of the iteration count by each annealing unit may differ depending on the temperature.

For example, the processing circuit 11b reads the replica number of each annealing unit in ascending order of temperature based on the correspondence information 12, and sequentially causes start of the search process by the annealing unit corresponding to the read replica number. The processing circuit 11b may cause start of the search processes by two annealing units, to which adjacent temperatures as targets of replica exchange are assigned, at the same timing.

A flow diagram D1 illustrates an example of the flow of a search process and replica exchange for the annealing units 1a0, . . . , 1an. In the flow diagram D1, the direction from the left side to the right side is the positive direction of time.

In one example, the temperature T0 is associated with a replica number i in the correspondence information 12. The processing circuit 11b first causes start of the search process by the annealing unit 1ai corresponding to the replica number i. The annealing unit 1ai starts the search process A0.

Furthermore, in the correspondence information 12, the replica number 0 is associated with the temperature T1. Therefore, the processing circuit 11b then causes start of the search process A1 by the annealing unit 1a0 corresponding to the replica number 0. The annealing unit 1a0 starts the search process A1.

Thus, the processing circuit 11b sequentially causes start of the search process (search processes A0, A1, A2, A3, . . . , An−1, An) by each annealing unit in ascending order of temperature (or in descending order of temperature). Here, a cycle of search processes (for example, search processes A0, . . . , An) for temperatures T0, . . . , Tn is referred to as one "process group". The respective search processes by the annealing units are executed in parallel. As described above, the processing circuit 11b may simultaneously cause start of two search processes (for example, a pair of search processes A0, A1) corresponding to adjacent temperatures as targets of replica exchange.

The respective search processes by the annealing units are completed in the order in which they are started. In the above example, the search processes A0, A1, . . . are completed in this order. When the process by the search processes A0, A1 is completed, the processing circuit 11b determines by Equation (4) whether or not to perform exchange of the temperatures assigned to the annealing units 1ai, 1a0 that have executed the search processes A0, A1, respectively, without waiting for the completion of the search processes by the other annealing units. When performing the exchange, the processing circuit 11b updates the correspondence information 12 by exchanging the replica numbers i, 0 in the correspondence information 12. For example, by the exchange, the temperature T0 is associated with the replica number 0, and the temperature T1 is associated with the replica number i. Moreover, the processing circuit 11b supplies the annealing unit 1a0 with temperature information indicating the temperature T0 after the exchange, and supplies the annealing unit 1ai with temperature information indicating the temperature T1 after the exchange. Then, the processing circuit 11b causes start of search processes B0, B1 by the annealing units 1a0, 1ai in the order according to the temperatures after the exchange. The processing circuit 11b may cause start of the search processes B0, B1 by the annealing units 1a0, 1ai, respectively, without waiting for the completion of the search processes by the other annealing units.

Every time the search processes by the two adjacent annealing units are completed, the processing circuit 11b performs the temperature exchange determination described above and the temperature exchange (that is, replica exchange) according to the determination, and causes start of the search processes by two annealing units in the order according to the temperatures after the exchange. In this manner, each annealing unit executes the search processes B0, B1, B2, B3, . . . , Bn−1, Bn of the next process group following the search processes A0, . . . , An.

The processing circuit 11b changes the pair of adjacent temperatures for the next process group so as to have a different pair from the previous process group, and performs the replica exchange of the two annealing units. For example, it is assumed that the processing circuit 11b have performed the replica exchange in the two annealing units corresponding to each pair of temperatures (T0, T1), (T2, T3), . . . , (Tn−1, Tn) (called even number mode) in the previous process group. In this case, the processing circuit 11b performs the replica exchange in the two annealing units corresponding to each pair of temperatures (T1, T2), (T3, T4), . . . , (Tn−2, Tn−1) (called odd number mode) in the next process group. In the odd number mode, the respective annealing units corresponding to the temperatures T0, Tn are not subject to the replica exchange.

Next, a processing procedure by the optimization device 10 will be described.

FIG. 2 is a flowchart illustrating a processing example of the optimization device.

Hereinafter, the even number mode will be mainly described, but in the odd number mode, the processing circuit 11b executes the procedure from the following step S1 after causing start of the search process by the annealing unit corresponding to the temperature T0. In the odd number mode, the processing circuit 11b causes start of the search process by the annealing unit corresponding to the temperature Tn after start of the search process by the annealing unit corresponding to the temperature Tn−1.

The optimization device 10 performs the pipeline processing of a series of procedures PL0, PL1, . . . , PLm. In the following, procedure PL0 will be mainly described, but procedures PL1, . . . , PLm are similar except that target temperatures and the annealing units corresponding to the temperatures are different. Here, as described above, n is an odd number in one example. At this time, m=(n+1)/2 in the even number mode and m=((n+1)/2)−1 in the odd number mode.

(S1) The processing circuit 11b determines a pair of adjacent temperatures based on the correspondence information 12. For example, in the procedure PL0, in the even number mode, a pair of adjacent temperatures T0, T1 is determined. In odd number mode, a pair of temperatures T1, T2 is determined.

(S2) The processing circuit 11b determines a pair of replica numbers corresponding to the pair of adjacent temperatures based on the correspondence information 12.

(S3) The processing circuit 11b instructs the start of the search process to every determined pair of replica numbers. In other words, the processing circuit 11b instructs the pair of annealing units (replicas) corresponding to the determined pair of replica numbers to start the search process at the temperatures assigned to the annealing units.

(S4) The pair of annealing units instructed to start the search process executes the search process.

(S5) When the search process of step S4 is completed, the pair of annealing units transmits the energy retained by each to the exchange control unit 11 (specifically, the processing circuit 11b of the exchange control unit 11).

(S6) The processing circuit 11b performs the replica exchange (determination on the temperature exchange between replicas and the temperature exchange according to the determination) by the corresponding pair of replica numbers based on the exchange probability of Equation (4) by an energy difference and a temperature difference of each annealing unit transmitted in step S5.

The optimization device 10 implements the pipeline processing by making each of the procedures PL0, PL1, . . . , PLm into one pipeline, and executing the procedures PL0, PL1, . . . , PLm in parallel in sequence, for example.

Thus, as illustrated in the flow diagram D1, the search process and the replica exchange can be combined and subjected to the pipeline processing. Therefore, the replica exchange can be performed from the replica for which the search process has been completed without waiting for completion of the search processes for all replicas. Latency due to the replica exchange is hidden in the pipeline. Therefore, the calculation by the optimization device 10 can be accelerated.

Furthermore, the optimization device 10 alternately repeats the even number mode and the odd number mode for every process group. Thus, it is expected that all replicas change back and forth between the high-temperature and low-temperature sides, which increases the likelihood of obtaining an appropriate solution.

Moreover, without waiting for completion of the search processes and the replica exchanges of all replicas in the current process group (search processes A0, . . . , An), the optimization device 10 may start the search processes belonging to the next process group (search processes B0, . . . , Bn). Thus, the calculation by the optimization device 10 can be further accelerated.

Second Embodiment

Next, a second embodiment will be described.

Figure 3:
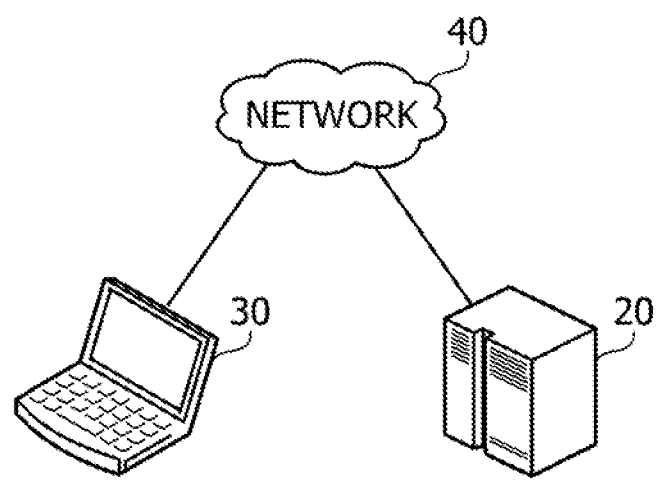
FIG. 3 is a diagram illustrating an example of an information processing system according to a second embodiment.

FIG. 3 is a diagram illustrating an example of an information processing system according to the second embodiment.

The information processing system according to the second embodiment includes an information processing device 20 and a client 30. The information processing device 20 and the client 30 are connected to a network 40. Examples of the network 40 may include a local area network (LAN), a wide area network (WAN), the Internet, or the like.

The information processing device 20 provides a function of replacing the combinatorial optimization problem with the Ising model and solving the combinatorial optimization problem at high speed by searching for a ground state of the Ising model.

The client 30 is a client computer used by a user, and is used for inputting a problem to be solved by the user to the information processing device 20.

Figure 4:
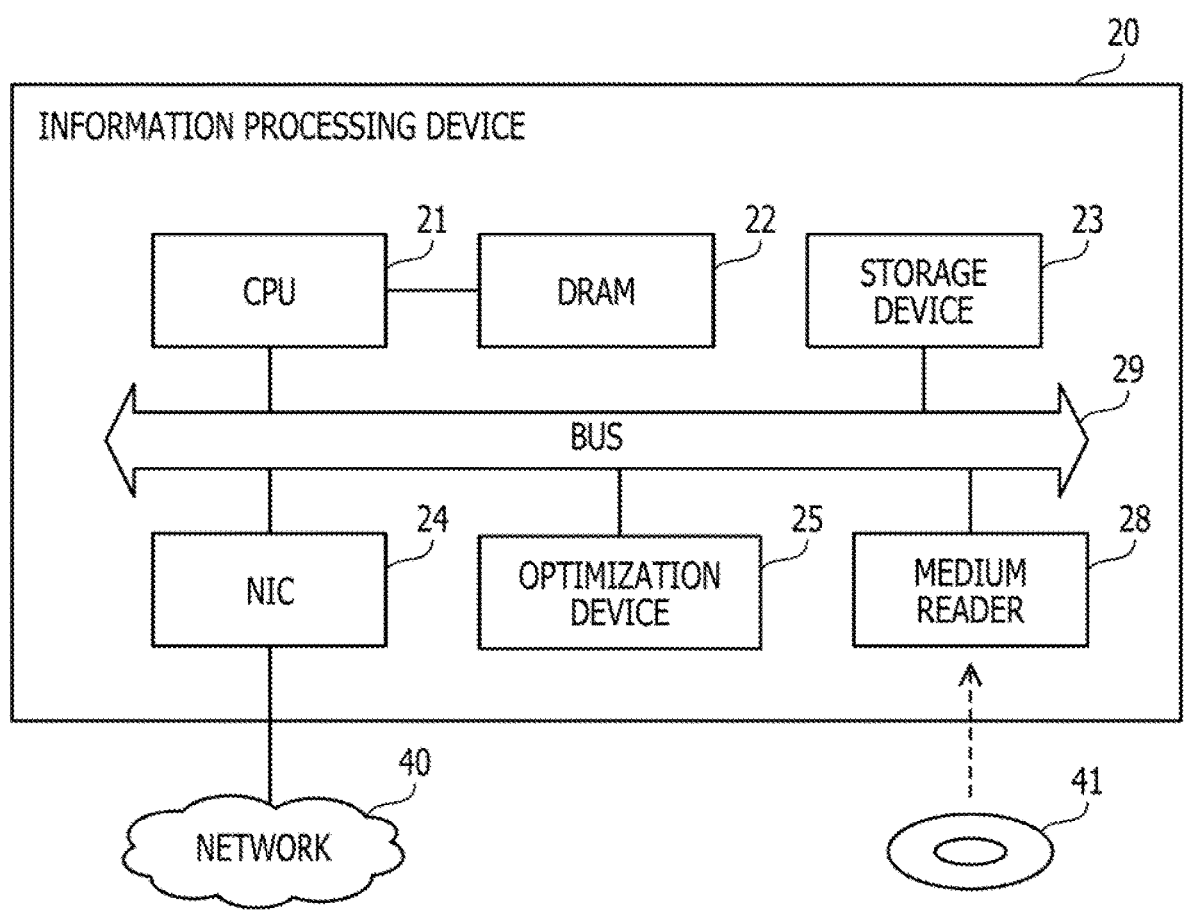
FIG. 4 is a block diagram illustrating a hardware example of an information processing device.

FIG. 4 is a block diagram illustrating a hardware example of an information processing device.

The information processing device 20 includes a central processing unit (CPU) 21, a dynamic random-access memory (DRAM) 22, a storage device 23, a network interface card (NIC) 24, an optimization device 25, and a medium reader 28. The CPU 21, the DRAM 22, the storage device 23, the NIC 24, the optimization device 25, and the medium reader 28 are connected to a bus 29 of the information processing device 20. The bus 29 is, for example, a peripheral component interconnect express (PCIe) bus.

The CPU 21 is a processor that executes instructions of a program stored in the DRAM 22. The CPU 21 loads at least a part of the program and data stored in the storage device 23 into the DRAM 22, and executes the program. The CPU 21 controls the settings and operations of the optimization device 25 by the functions exhibited by executing the program.

The DRAM 22 is a main storage device of the information processing device 20, and temporarily stores a program executed by the CPU 21 and data and the like set in the optimization device 25.

The storage device 23 is an auxiliary storage device of the information processing device 20, and stores programs executed by the CPU 21 and data and the like set in the optimization device 25. For example, the storage device 23 is a solid state drive (SSD), a hard disk drive (HDD), or the like.

The NIC 24 is a communication interface that is connected to the network 40 and communicates with the client 30 via the network 40. The NIC 24 is connected to, for example, relay devices such as a router or a switch in the network 40 by cables.

The optimization device 25 searches for the ground state of the Ising model under the control of the CPU 21. The optimization device 25 is, for example, a semiconductor integrated circuit of one or more chips, and is implemented by using an FPGA or the like. The optimization device 25 is an example of the optimization device 10 according to the first embodiment.

The medium reader 28 is a reading device that reads programs and data recorded on a recording medium 41. As the recording medium 41, for example, a magnetic disk, an optical disk, a magneto-optical disk (MO), a semiconductor memory, or the like can be used. The magnetic disk includes a flexible disk (FD) and an HDD. The optical disc includes a compact disc (CD) and a digital versatile disc (DVD).

The medium reader 28 copies, for example, a program and data read from the recording medium 41 to another recording medium such as the DRAM 22 or the storage device 23. The read program is executed by, for example, CPU 21. Note that the recording medium 41 may be a portable recording medium, and may be used for distribution of programs and data. Furthermore, the recording medium 41 and the storage device 23 may be sometimes referred to as computer-readable recording media.

Note that the client 30 has a CPU, a main storage device, an auxiliary storage device, an NIC, an input device such as a mouse and a keyboard, and a display.

Figure 5:
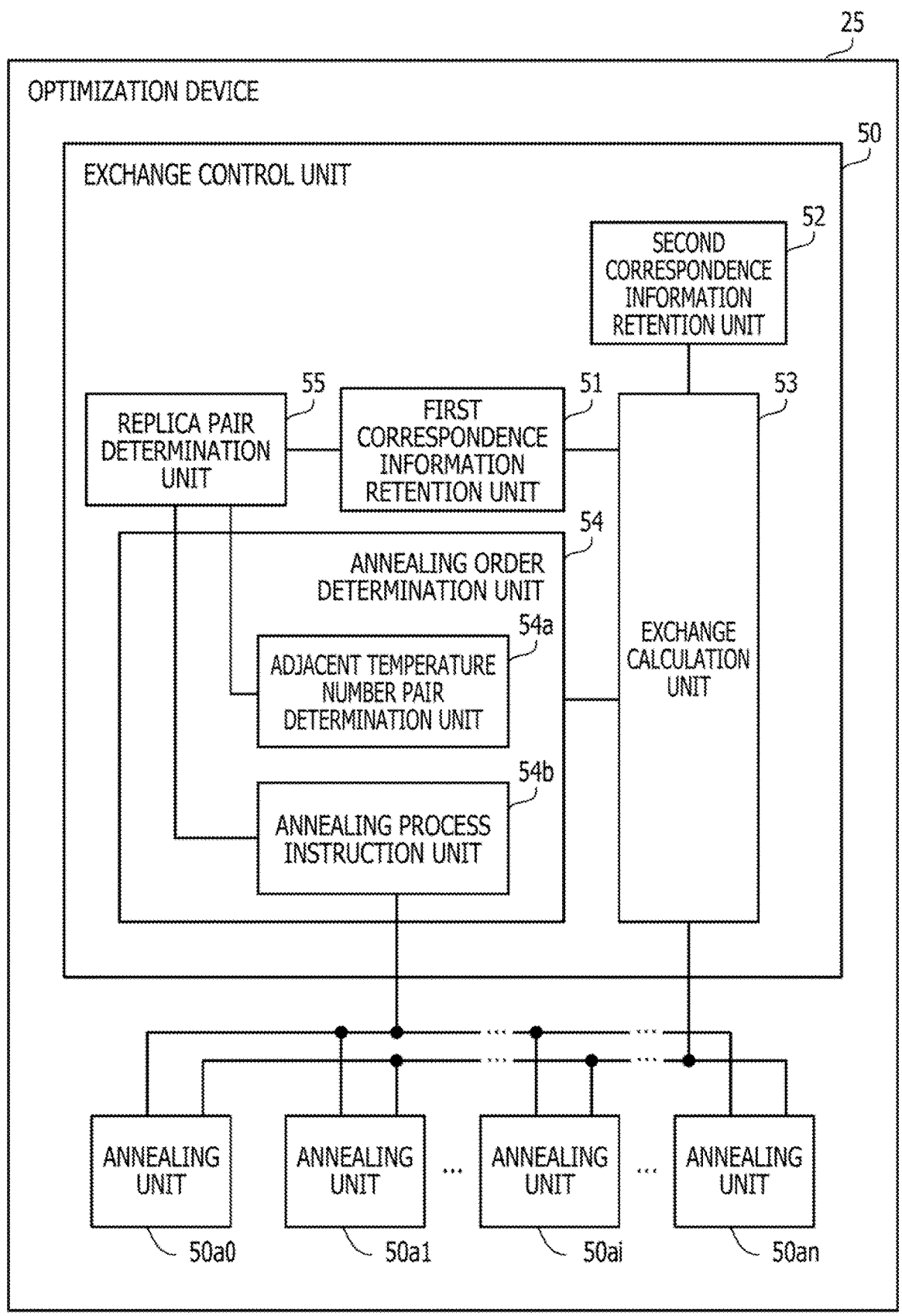
FIG. 5 is a block diagram illustrating a hardware example of the optimization device.

FIG. 5 is a block diagram illustrating a hardware example of the optimization device.

The optimization device 25 includes annealing units 50a0, 50a1, . . . , 50ai, . . . , 50an and an exchange control unit 50. Each of the annealing units 50a0, . . . , 50an is sometimes called a replica. n is, for example, an odd number of 1 or more, n+1 indicates the number of annealing units of the optimization device 25. i is an integer of 0 or more and n or less.

Each of the annealing units 50a0, ..., 50an retains a plurality of state variables included in the evaluation function representing the energy of the Ising model. One state variable is, for example, a bit (spin bit) that takes a binary value of 0 or 1. A plurality of state variables is represented by, for example, a bit string (spin bit string). Each of the annealing units 50a0, ..., 50an changes the state of the Ising model by changing the value of one of the plurality of state variables.

Each of the annealing units 50a0, ..., 50an performs a process including, when the value of any of the plurality of state variables changes, based on a change in the energy accompanying a change in a value of each of the plurality of state variables and a temperature, probabilistically determining which change of value of the plurality of state variables is accepted, and determining a value of each of the plurality of state variables with respect to the temperature. The annealing unit 50a0, ..., 50an determines a value of each of the plurality of state variables with respect to the temperature by performing the above-mentioned probabilistic search a certain iteration count. In the following, the process of determining a value of each state variable with respect to an assigned temperature by performing the probabilistic search a certain iteration count may be referred to as "annealing process". The annealing process corresponds to the search process of the first embodiment.

The exchange control unit 50 gives temperature information (for example, the inverse temperature $\beta_i$ (the reciprocal of temperature T)) to each of the annealing units 50a0, ..., 50an. The exchange control unit 50 includes a first correspondence information retention unit 51, a second correspondence information retention unit 52, an exchange calculation unit 53, an annealing order determination unit 54, and a replica pair determination unit 55. The first correspondence information retention unit 51 and the second correspondence information retention unit 52 are storage circuits such as registers, for example. The first correspondence information retention unit 51 and the second correspondence information retention unit 52 may be a volatile memory such as a RAM, or a non-volatile memory such as a flash memory or EEPROM.

The first correspondence information retention unit 51 retains first correspondence information. The first correspondence information indicates the correspondence relationship between identification information of temperature (temperature identification information) assigned to each of the annealing units 50a0, ..., 50an and identification information of each of the annealing units 50a0, ..., 50an. For example, the temperature identification information is a temperature number. For example, the identification information of each of the annealing units 50a0, ..., 50an is a replica number. The first correspondence information is information in which the replica numbers are arranged in ascending or descending order of temperature.

The second correspondence information retention unit 52 retrains second correspondence information. The second correspondence information is information indicating the correspondence relationship between the temperature numbers and temperatures. For example, the temperature numbers are associated with each temperature in ascending order such as 0, 1, 2, ... in ascending order of temperature.

The exchange calculation unit 53 receives the energy from the annealing units 50a0, ..., 50an, and performs the replica exchange for two annealing units to which adjacent temperatures are assigned. The exchange calculation unit 53 performs the replica exchange for the two annealing units every time it receives the energy after the annealing process by the two annealing units to which adjacent temperatures are assigned.

The exchange calculation unit 53 calculates the temperature exchange probability by the replica exchange by Equation (4). The function f of the metropolis method in Equation (2) is used for the function f of Equation (4). For example, the exchange calculation unit 53 determines whether or not to perform exchange of the temperatures in two annealing units to which adjacent temperatures are assigned according to a comparison between the exchange probability calculated by Equation (4) and a uniform random number generated in the interval [0, 1).

The exchange calculation unit 53 updates the first correspondence information stored in the first correspondence information retention unit 51 in response to the exchange of temperature. In response to the exchange of temperature, the exchange calculation unit 53 refers to the second correspondence information stored in the second correspondence information retention unit 52, and supplies temperature information indicating temperatures after exchange to the two annealing units that are targets of temperature exchange. When the process of the replica exchange for the two annealing units is completed, the exchange calculation unit 53 notifies the annealing order determination unit 54 of the completion of the process.

The annealing order determination unit 54 determines the starting order of the annealing process by each of the annealing units 50a0, ..., 50an in the order of the temperature (temperature number) assigned to each annealing unit. The annealing order determination unit 54 has an adjacent temperature number pair determination unit 54a and an annealing process instruction unit 54b.

The adjacent temperature number pair determination unit 54a outputs adjacent temperature assurance information to the replica pair determination unit 55. The adjacent temperature assurance information is information indicating a set of adjacent temperature numbers. For example, the adjacent temperature number pair determination unit 54a first sets the even number mode, then sets the odd number mode, and then switches between the even number mode and the odd number mode in order. In the even number mode, the sets of adjacent temperature numbers are (0, 1), (2, 3), (4, 5), ..., (n–1, n). In the odd number mode, the sets of adjacent temperature numbers are (1, 2), (3, 4), (5, 6), ..., (n–2, n–1). The adjacent temperature number pair determination unit 54a sequentially supplies the sets of adjacent temperature numbers to the replica pair determination unit 55 based on the adjacent temperature assurance information according to the current mode.

The annealing process instruction unit 54b receives a notification of the replica number to start the annealing process next from the replica pair determination unit 55, and instructs the annealing unit corresponding to the replica number to start the annealing process.

The replica pair determination unit 55 receives the adjacent temperature assurance information from the adjacent temperature number pair determination unit 54a. The replica pair determination unit 55 determines the pair of replica numbers corresponding to the adjacent temperature assurance information by referring to the first correspondence information stored in the first correspondence information retention unit 51, The replica pair determination unit 55 notifies the annealing process instruction unit 54b of the replica number belonging to the determined pair.

Next, an example of the annealing units 50a0, ..., 50an will be described. The annealing unit 50ai will be mainly described, but the other annealing units have similar configurations.

Figure 6:
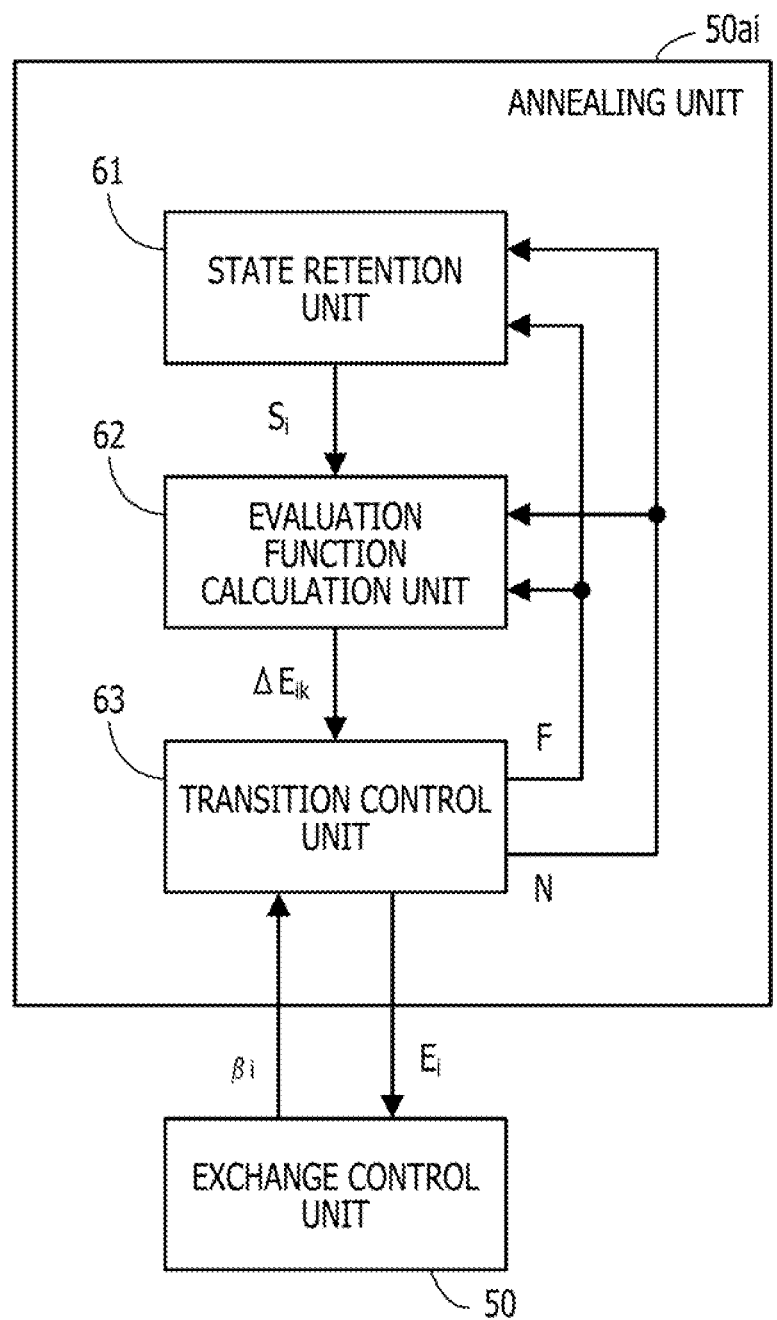
FIG. 6 is a block diagram illustrating a hardware example of an annealing unit.

FIG. 6 is a block diagram illustrating a hardware example of the annealing unit.

The annealing unit 50ai has a state retention unit 61, an evaluation function calculation unit 62, and a transition control unit 63.

The state retention unit 61 retains values of a plurality of state variables included in the evaluation function. Furthermore, the state retention unit 61 updates the states $S_i$ that are the values of the plurality of state variables, based on a flag F indicating whether state transition is enabled or disabled, and the identification number (index) N of a state variable indicated by the flags F.

The evaluation function calculation unit 62 calculates energy changes accompanying changes in the state variables (state transitions). For example, a case is considered where the evaluation function is represented by an Ising model represented by connection between two state variables, and only one state variable transition is allowed at a time. In this case, the evaluation function calculation unit 62 calculates the energy change $\Delta E_{ik}$ accompanying the change (state transition) of each of the plurality of state variables, based on the value of each state variable, the coupling coefficient indicating the strength of connection between the state variables, the identification number N, and the flag F. The energy change $\Delta E_{ik}$ indicates an energy change accompanying a change in a k-th state variable. The value of the coupling coefficient corresponding to the optimization problem desired to be calculated is stored in advance in a memory, a register, or the like included in the optimization device 25. When the evaluation function is not the Ising model, and when transitions of a plurality of state variables at a time are allowed, the numbers of the state transitions and the numbers of the changing state variables do not always match. However, it is only sufficient to properly calculate energy changes corresponding to the numbers of the state transitions. The evaluation function calculation unit 62 can be implemented using, for example, a logic circuit such as a product-sum operation circuit.

The transition control unit 63 performs a probabilistic search by determining the acceptance probability of the state transition of the k-th state variable with Equation (3) by using the energy change $\Delta E_{iK}$ and the inverse temperature $\beta_i$ assigned by the exchange control unit 50, similarly to a normal simulated annealing method. Here, the function fin Equation (3) is the same as that in Equation (1). For example, the function f of the Metropolis method in Equation (2) is used. The transition control unit 63 outputs a flag F indicating whether state transition is enabled or disabled and an identification number N indicating a state variable (state variable to be changed) corresponding to the flag F, based on the above-described acceptance probability of the state transition. Furthermore, the transition control unit 63 updates an energy $E_i$ based on the energy change $\Delta E_{iN}$ and outputs the energy $E_i$ to the exchange control unit 50.

FIG. 7 is a diagram illustrating an example of first correspondence information.

The first correspondence information 71 is retained in the first correspondence information retention unit 51. In the first correspondence information 71, a case where the number of annealing units 50a0, ..., 50an, that is, the number of replicas is sixteen, is illustrated.

In the first correspondence information 71, the replica numbers from 0 to 15 corresponding to respective temperature numbers are arranged in the order of the temperature numbers from 0 to 15. As an example, temperature numbers 0, 1, 2, ..., 15 are assigned in ascending order of temperature. However, temperature numbers 0, 1, 2, ..., 15 may be assigned in descending order of temperature.

FIG. 8 is a diagram illustrating an example of second correspondence information.

The second correspondence information 72 is retained in the second correspondence information retention unit 52. The second correspondence information 72 also exemplifies the case where the number of annealing units 50a0, ..., 50an, that is, the number of replicas is sixteen.

In the second correspondence information 72, the temperatures from T0 to T15 corresponding to respective temperature numbers are arranged in the order of the temperature numbers from 0 to 15. For example, the temperature $T0<T1<T2<...<T14<T15$.

Thus, the exchange control unit 50 retains the second correspondence information 72 indicating the correspondence relationship between the temperature and the temperature identification information (temperature number). The exchange control unit 50 converts the temperature identification information (temperature number) corresponding to identification information (replica number) of each of the plurality of annealing units into temperature based on the second correspondence information 72.

Next, the procedure of annealing process control by the optimization device 25 will be described. An upper limit value (threshold described later) of the iteration count of the probabilistic search in the annealing process is set in advance in the optimization device 25. For example, the upper limit value of the iteration count is the same value for each of the annealing units 50a0, ..., 50an.

Figure 9:
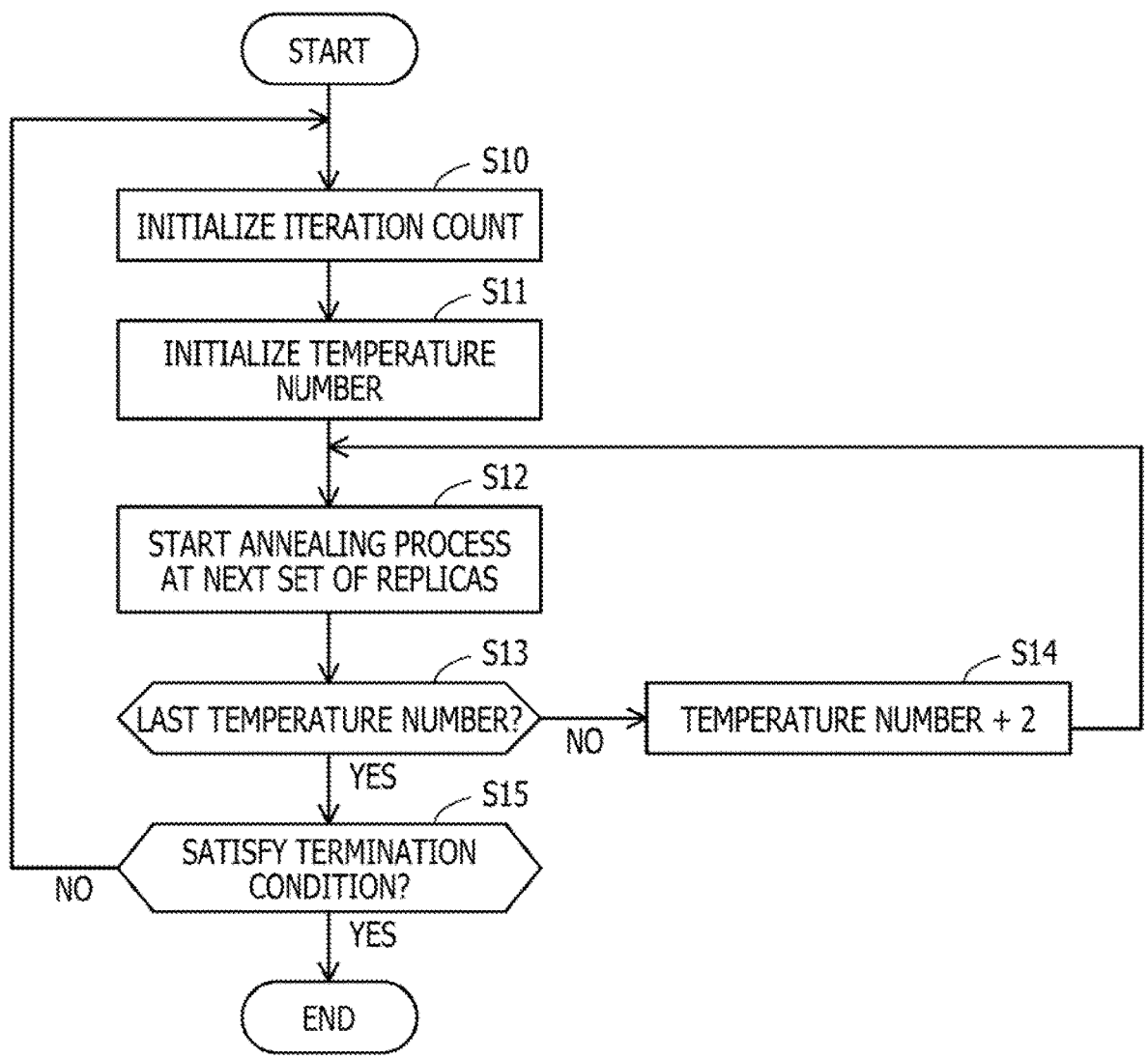
FIG. 9 is a flowchart illustrating an example of annealing process control.

FIG. 9 is a flowchart illustrating an example of the annealing process control.

(S10) Each of the annealing units 50a0, ..., 50an initializes the iteration count of the probabilistic search to zero.

(S11) The adjacent temperature number pair determination unit 54a initializes the temperature number according to whether the current mode is the even number mode or the odd number mode. When the current mode is the even number mode, the adjacent temperature number pair determination unit 54a initializes the temperature number K to 0. When the current mode is the odd number mode, the adjacent temperature number pair determination unit 54a initializes the temperature number K to 1. For example, the adjacent temperature number pair determination unit 54a has a counter that counts the temperature number K.

Note that the adjacent temperature number pair determination unit 54a switches between the even number mode and the odd number mode when step S11 is executed after the execution of step S10. When the previous mode is the odd number mode, the adjacent temperature number pair determination unit 54a sets the even number mode this time. When the previous mode is the even number mode, the adjacent temperature number pair determination unit 54a sets the odd number mode this time. For example, when step S11 is executed for the first time, the adjacent temperature number pair determination unit 54a sets the even number mode this time.

(S12) The adjacent temperature number pair determination unit 54a refers to the first correspondence information 71 stored in the first correspondence information retention unit 51, and reads a pair of temperature numbers (pair of temperature numbers (K, K+1)) in ascending order of the temperature numbers. The adjacent temperature number pair determination unit 54a outputs the adjacent temperature assurance information including the pair of the temperature numbers to the replica pair determination unit 55. The replica pair determination unit 55 acquires a pair of replica numbers corresponding to the pair of the temperature numbers indicated in the adjacent temperature assurance information with reference to the first correspondence information 71, and supplies the pair of replica numbers to the annealing process instruction unit 54b. The annealing process instruction unit 54b instructs the annealing units corresponding to the pair of replica numbers supplied from the replica pair determination unit 55 to start the annealing process.

Note that when executing step S12 for the first time after switching to the odd number mode, the adjacent temperature number pair determination unit 54a first supplies the temperature number 0 to the replica pair determination unit 55. The replica pair determination unit 55 acquires the replica number corresponding to the temperature number 0 with reference to the first correspondence information 71, and supplies the replica number to the annealing process instruction unit 54b. The annealing process instruction unit 54b instructs the annealing unit corresponding to the replica number of the temperature number 0 to start the annealing process. Thereafter, the adjacent temperature number pair determination unit 54a supplies the adjacent temperature assurance information from the set of the temperature numbers (1, 2) to the replica pair determination unit 55. Furthermore, in the odd number mode, the last set of replicas that performs annealing process includes only the annealing unit corresponding to the last temperature number (temperature number 15 in the example of FIG. 7).

(S13) The adjacent temperature number pair determination unit 54a determines whether or not the temperature number supplied to the replica pair determination unit 55 in step S12 is the last temperature number in the first correspondence information. When it is the last temperature number, the process proceeds to step S15. When it is not the last temperature number, the process proceeds to step S14.

(S14) The adjacent temperature number pair determination unit 54a applies +2 to the temperature number (adds 2 to the temperature number). For example, 2 is added to the temperature number K to have K=K+2. Then, the process proceeds to step S12. By repeatedly executing step S12, the annealing process by the set of replicas is sequentially started at predetermined time intervals.

(S15) When the current annealing process by each of the annealing units 50a0, . . . , 50an is completed, the exchange calculation unit 53 determines whether or not the termination condition of the annealing process is satisfied. When the termination condition is satisfied, the annealing process control ends. When the termination condition is not satisfied, the process proceeds to step S10. As the termination condition, it is conceivable that the annealing process control described above is executed a predetermined number of times (switching between the even number mode and the odd number mode is executed a predetermined number of times), that energy of one of the annealing units is below the target value, or the like.

Thus, the annealing order determination unit 54 sequentially causes start of the annealing process by each annealing unit in the order of temperature numbers (ascending or descending order). The annealing process is performed in parallel by each annealing unit.

For example, when the termination condition is satisfied in step S15 and the annealing process of each of the annealing units 50a0, . . . , 50an is completed, the minimum value of energy by each annealing unit and the value of each state variable at the time of the minimum value are output to the DRAM 22 via the CPU 21. For example, the CPU 21 converts the value of each state variable into result information that is easy for the user to understand, and provides the result information to the client 30 via the network 40.

Next, a procedure for executing the annealing process and the replica exchange will be described.

Figure 10:
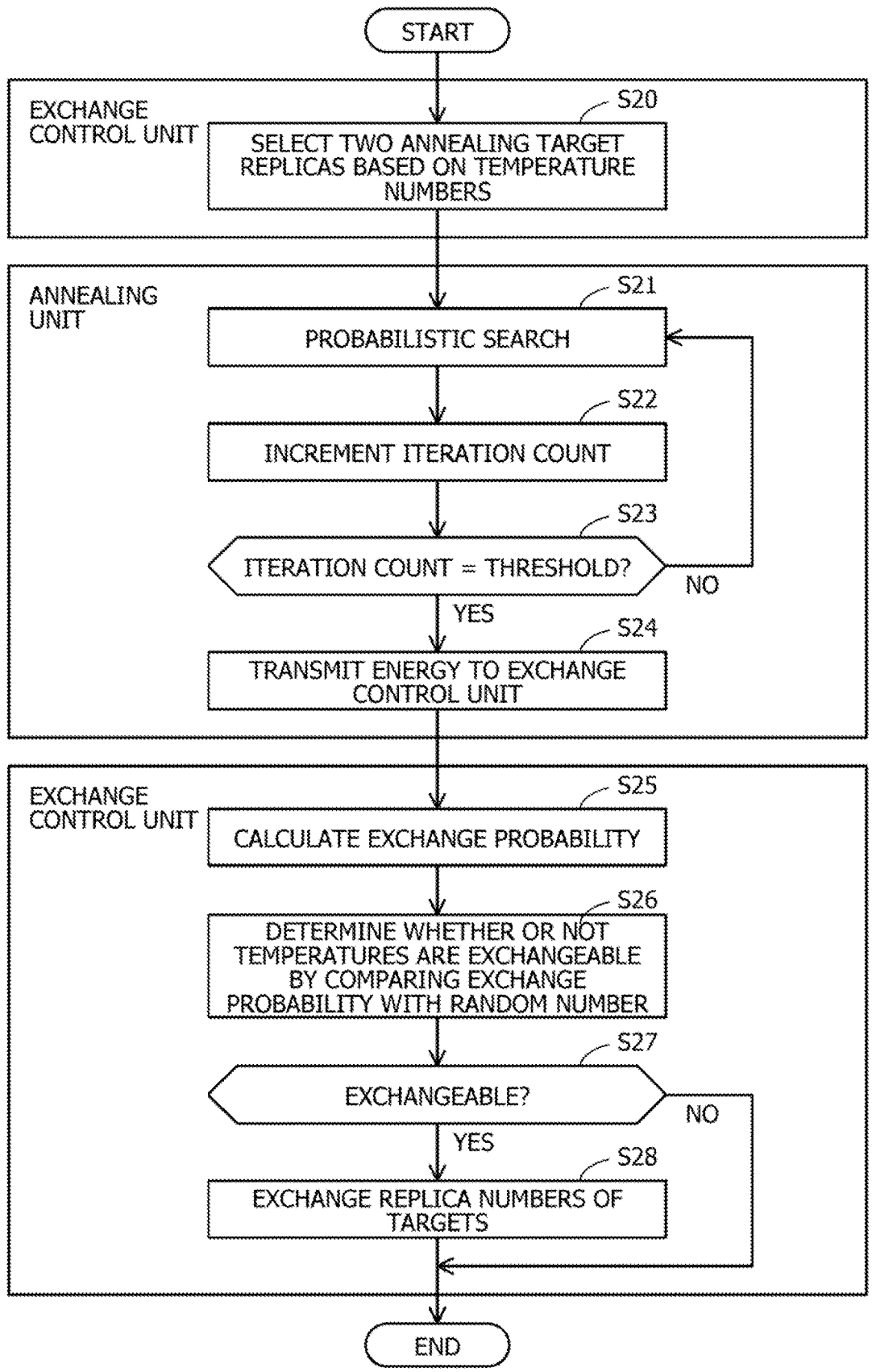
FIG. 10 is a flowchart illustrating an execution example of annealing process and replica exchange.

FIG. 10 is a flowchart illustrating an execution example of the annealing process and the replica exchange.

Step S20 is executed by the exchange control unit 50.

(S20) The replica pair determination unit 55 selects two replica numbers of annealing target replicas based on the temperature numbers supplied by the adjacent temperature number pair determination unit 54a in step S12, and supplies them to the annealing process instruction unit 54b. The annealing process instruction unit 54b instructs the two annealing units corresponding to the pair of the replica numbers to start the annealing process. In the odd number mode, there is only one first and last annealing target replicas, as described in step S12. Step S20 corresponds to step S12.

Steps S21 to S24 are executed by each of the annealing units 50a0, . . . , 50an. The execution order is determined in temperature order by the annealing order determination unit 54 as described above. In the following, the description is focused on the annealing unit 50ai, but the same procedure will be performed for the other annealing units.

(S21) When the annealing unit 50ai has received an instruction to start the annealing process from the annealing process instruction unit 54b, the annealing unit 50ai executes the probabilistic search using the temperature supplied by the exchange calculation unit 53.

(S22) The annealing unit 50ai increments the iteration count of the probabilistic search (adds 1 to the iteration count).

(S23) The annealing unit 50ai determines whether the iteration count has reached the threshold (that is, whether or not the iteration count=threshold). When the iteration count has reached the threshold, the current annealing process by the annealing unit 50ai is completed, and the process proceeds to step S24. When the iteration count has not reached the threshold, the process proceeds to step S21.

(S24) The annealing unit 50ai transmits an energy obtained as a result of the probabilistic search to the exchange control unit 50 (more specifically, the exchange calculation unit 53 of the exchange control unit 50).

Steps S25 to S28 are executed by the exchange control unit 50.

(S25) When the exchange calculation unit 53 has received energies from two annealing units to which adjacent temperatures are assigned, the exchange calculation unit 53 calculates an exchange probability by Equations (4), (2) based on two temperatures and two energies.

(S26) The exchange calculation unit 53 determines whether or not temperatures are exchangeable in the two annealing units to which the adjacent temperatures are assigned by comparing the calculated exchange probability with a random number.

(S27) When the result of step S26 is that they are exchangeable, the exchange calculation unit 53 advances the process to step S28. When they are not exchangeable, the processing of the exchange calculation unit 53 for the corresponding annealing unit (replica) pair ends without the exchange being performed.

(S28) The exchange calculation unit 53 updates the first correspondence information 71 by exchanging the replica numbers corresponding to the two annealing units as targets of exchange in the first correspondence information 71. Thus, the replica numbers after the exchange in the first correspondence information 71 is associated with temperature numbers different from those before the exchange. The exchange calculation unit 53 reads out the temperatures corresponding to the temperature numbers after the exchange from the second correspondence information 72. The exchange calculation unit 53 supplies the annealing units corresponding to the exchanged replica numbers with temperature information indicating the temperatures (or inverse temperatures) after the exchange. Then, the processing of the exchange calculation unit 53 for the corresponding replica pair is completed.

The optimization device 25 can accelerate the calculation by performing the pipeline processing of the procedure of steps S20 to S28 described above by every pair of annealing units.

Here, after determining whether or not to perform exchange of the temperatures assigned to the two annealing units, the exchange control unit 50 may cause start of the annealing process by the two annealing units based on the first correspondence information 71 without waiting for completion of the processing by the other annealing units. Specifically, when the termination condition of step S15 is not satisfied by the annealing process of the two annealing units after steps S25 to S28, the exchange control unit 50 may proceed to step S10, initialize the iteration count of the two annealing units, and execute step S11 and subsequent steps.

In this way, the optimization device 25 can start the next process group before all the annealing process and replica exchange in the current process group are completed. For example, the adjacent temperature number pair determination unit 54a has a counter having a temperature number K1 for the current process group and a counter having a temperature number K2 for the next process group, and controls the starting order of annealing process by the two process groups by the two counters. The adjacent temperature number pair determination unit 54a may use three or more counters to control the starting order of annealing process by each of the three or more process groups. Here, as described above, the "process group" indicates a cycle of annealing processes for the temperature numbers 0, . . . , 15 set in the first correspondence information 71.

For example, in steps S11 and S12, the exchange control unit 50 causes start of the next process group in the odd number mode while sequentially executing the annealing process and the replica exchange belonging to the current process group in the even number mode. Alternatively, the exchange control unit 50 causes start of the next process group in the even number mode while sequentially executing the annealing process and the replica exchange belonging to the current process group in the odd number mode. Thus, the calculation of the optimization device 25 can be further accelerated.

Figure 11:
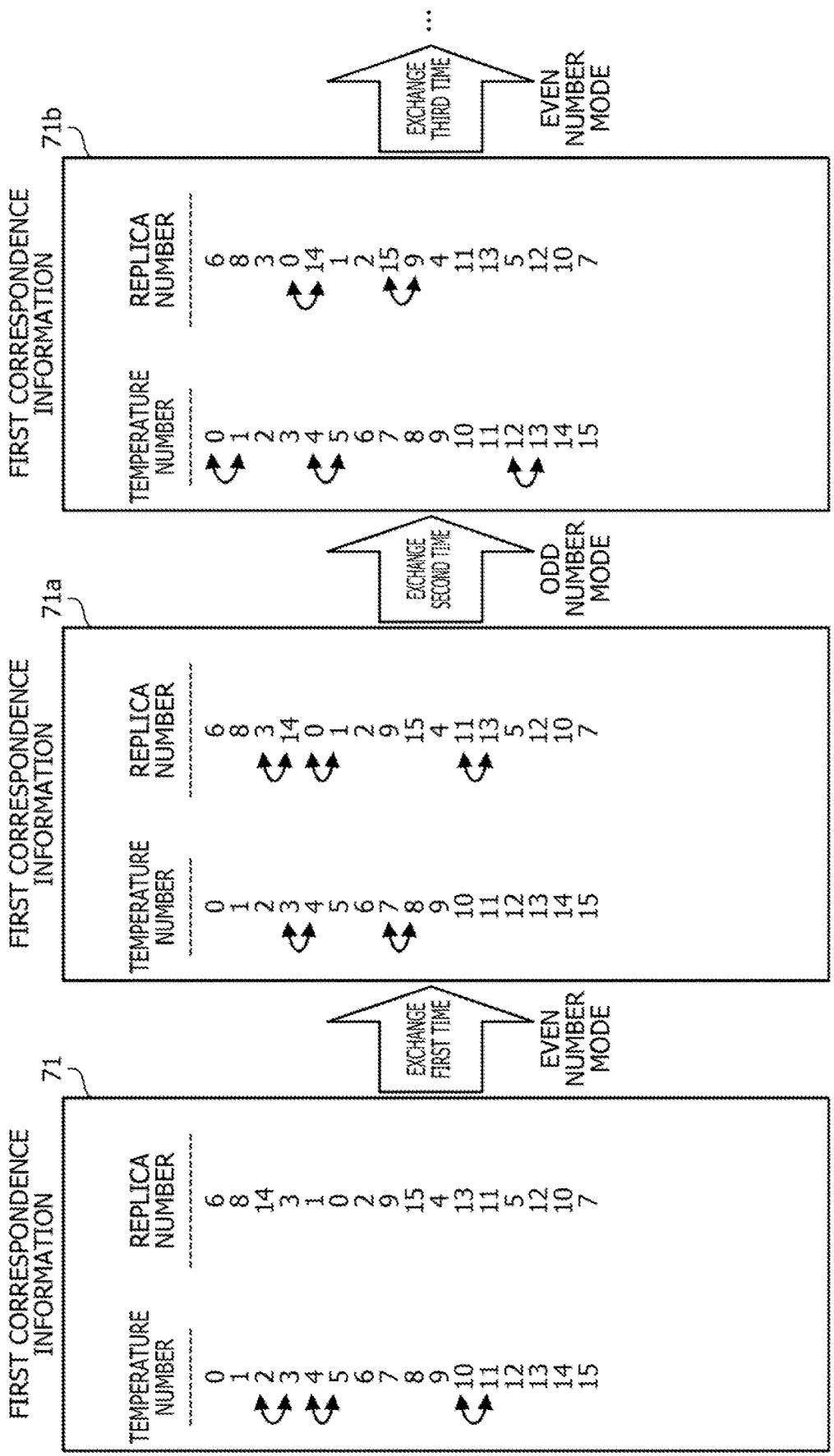
FIG. 11 is a diagram illustrating an example of temperature exchange.

FIG. 11 is a diagram illustrating an example of temperature exchange.

The exchange calculation unit 53 changes the replica numbers to be exchanged according to either the even number mode or the odd number mode. As described above, in the even number mode, the temperature number sets (0, 1), (2, 3), (4, 5), . . . are targets of exchange. In the odd number mode, the temperature number sets (1, 2), (3, 4), (5, 6), . . . are targets of exchange.

For example, the exchange control unit 50 performs the replica exchange in the even number mode in the first process group. The replica exchange in the first process group is referred to as the "first exchange". The first correspondence information 71 indicates before the first exchange. The first correspondence information 71a indicates after the first exchange.

For example, in the first exchange, the replica number 14 corresponding to the temperature number 2 and the replica number 3 corresponding to the temperature number 3 are exchanged. After the exchange, the temperature number 2 is associated with the replica number 3, and the temperature number 3 is associated with the replica number 14. Furthermore, in the first exchange, the replica number 1 corresponding to the temperature number 4 and the replica number 0 corresponding to the temperature number 5 are exchanged. After the exchange, the temperature number 4 is associated with the replica number 0, and the temperature number 5 is associated with the replica number 1. Moreover, in the first exchange, the replica number 13 corresponding to the temperature number 10 and the replica number 11 corresponding to the temperature number 11 are exchanged. After the exchange, the temperature number 10 is associated with the replica number 11, and the temperature number 11 is associated with the replica number 13.

The exchange control unit 50 performs the replica exchange in the odd number mode in the second process group. The replica exchange in the second process group is referred to as the "second exchange". The first. correspondence information 71a indicates before the second exchange. The first correspondence information 71b indicates after the second exchange.

For example, in the second exchange, the replica number 14 corresponding to the temperature number 3 and the replica number 0 corresponding to the temperature number 4 are exchanged. After the exchange, the temperature number 3 is associated with the replica number 0, and the temperature number 4 is associated with the replica number 14. Furthermore, in the second exchange, the replica number 9 corresponding to the temperature number 7 and the replica number 15 corresponding to the temperature number 8 are exchanged. After the exchange, the temperature number 7 is associated with the replica number 15, and the temperature number 8 is associated with the replica number 9.

The exchange control unit 50 performs replica exchange in the even number mode in the third process group. The replica exchange in the third process group is referred to as the "third exchange". The first correspondence information 71b indicates before the third exchange. The illustration of the first correspondence information after the third exchange is omitted. For example, in the third exchange, the replica number 6 corresponding to the temperature number 0 and the replica number 8 corresponding to the temperature number 1 are exchanged. Furthermore, in the third exchange, the replica number 14 corresponding to the temperature number 4 and the replica number 1 corresponding to the temperature number 5 are exchanged. Moreover, in the third exchange, the replica number 5 corresponding to the temperature number 12 and the replica number 12 corresponding to the temperature number 13 are exchanged.

As described above, when performing the exchange of temperatures, the exchange control unit 50 exchanges the respective replica numbers of the two annealing units associated with the two adjacent temperatures in the first correspondence information 71, 71a, 71b, thereby updating the first correspondence information 71, 71a, 71b. Thus, when causing each replica to start the annealing process in ascending or descending order of temperature, it is not necessary to sort the first correspondence information 71, 71a, 71b by temperature number, and the annealing process by each replica can be started at high speed.

In this manner, the exchange control unit 50 performs the replica exchange while switching between the even number mode and the odd number mode. In other words, the exchange control unit 50 determines whether or not to perform exchange of temperatures in the pair of annealing units corresponding to each of the plurality of first pairs of two adjacent temperatures for the current annealing process by each of the plurality of annealing units. The exchange control unit 50 determines whether or not to perform exchange of the temperatures in a plurality of pairs of two adjacent temperatures for the next annealing process by each of the plurality of annealing units, and pairs of annealing units corresponding to the plurality of respective second pairs different from the plurality of first pairs. Each of the plurality of second pairs is a pair different from each of the plurality of first pairs. Thus, it is expected that all replicas change back and forth between the high-temperature and low-temperature sides, which increases the likelihood of obtaining an appropriate solution.

Figure 12:
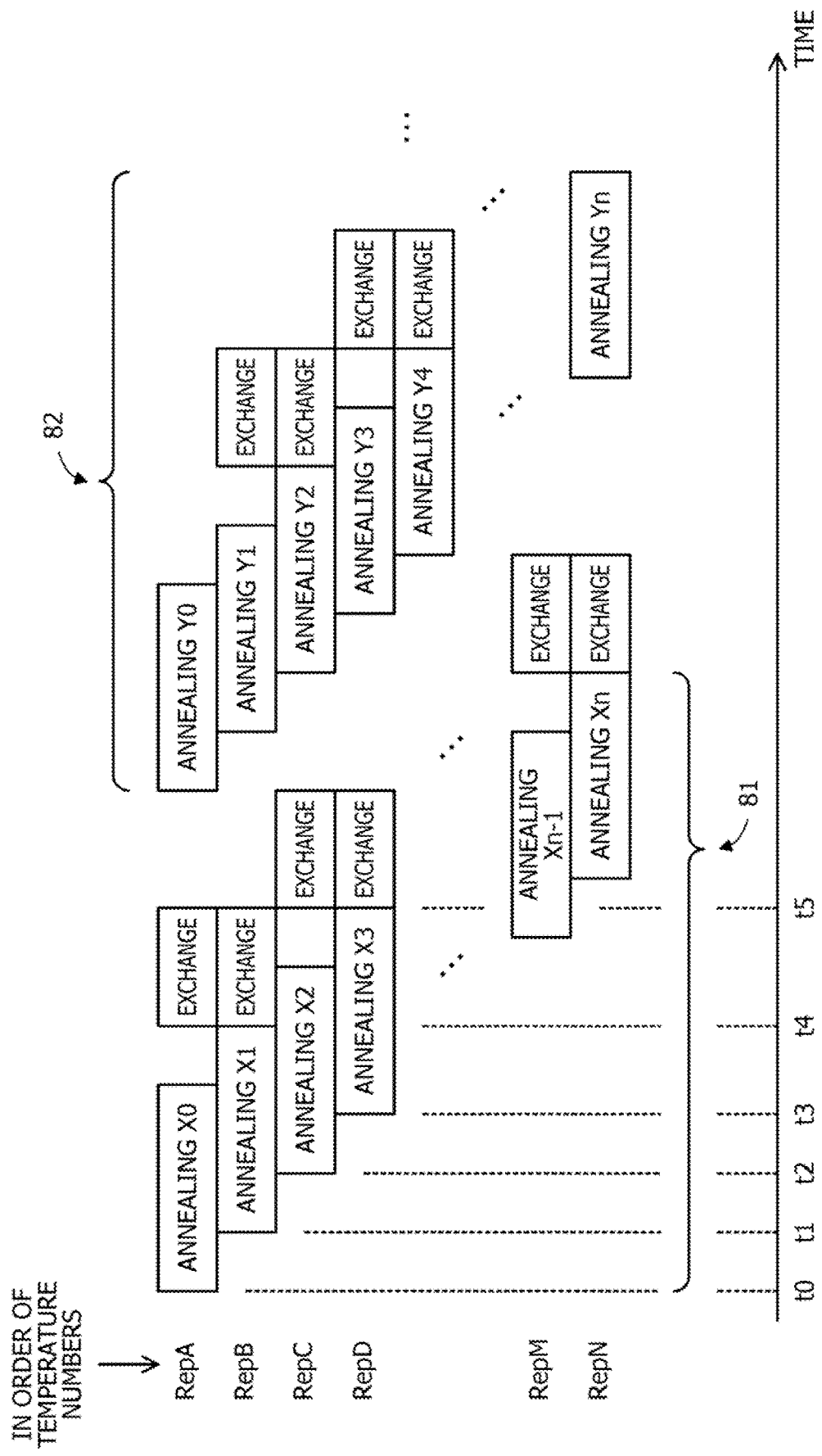
FIG. 12 is a diagram illustrating an example of pipeline processing.

FIG. 12 is a diagram illustrating an example of the pipeline processing.

The replica numbers arranged in ascending order of temperature numbers are represented as RepA, RepB, RepC, RepD, . . . , RepM, RepN. The replica number substituted into each of RepA, . . . , RepN in a process group 81 may be different from the replica number substituted into each of RepA, . . . , RepN in a process group 82 following the process group 81. In the following, "annealing process" may be abbreviated as "annealing".

The process group 81 includes annealings X0, X1, X2, X3, . . . , Xn-1, Xn performed by each replica in order of temperature numbers. The process group 82 includes annealings Y0, Y1, Y2, Y3, . . . , Yn-1, Yn performed by each replica in order of temperature numbers. The replica exchange for each annealing in the process group 81 is performed in the even number mode. The replica exchange for each annealing in the process group 82 is performed in the odd number mode.

For example, the annealing X0 starts to be executed at time t0. The annealing X1 starts to be executed at time t1. For example, time t1 is a time after a predetermined time from time t0. However, the annealing X1 may be started to be executed at the same time as the annealing X0 (it may be t0=t1).

The annealing X2 starts to be executed at time t2. For example, time t2 is a time after a predetermined time from time t1. The annealing X3 starts to be executed at time t3. For example, time t3 is a time after a predetermined time from time t2. However, the annealing X3 may be started to be executed at the same time as the annealing X2 (it may be t2=t3). Thereafter, the annealing is started to be executed in order of temperature numbers.

For example, the annealing X0 completes before time t4 when the annealings X2, X3, . . . are being executed, and annealing X1 completes at time t4. In other words, at time t4, the annealings X0, X1 are completed. At time t4 (or immediately after the annealing X1 is completed at time t4), the exchange control unit 50 starts the replica exchange of the annealing unit of replica number RepA that has executed the annealing X0 with the annealing unit of replica number RepB that has executed the annealing X1. For example, the replica exchange is completed at time t5.

Here, for example, the annealing X2 is completed before time t5 when the annealing process after the annealing X3 is being executed, and the annealing X3 is completed at time t5. In other words, at time t5, the annealings X2, X3 are completed. At time t5 (or immediately after the annealing X3 is completed at time t5), the exchange control unit 50 starts the replica exchange of the annealing unit of replica number RepC that has executed the annealing X2 with the annealing unit of replica number RepD that has executed the annealing X3.

Thus, the exchange control unit 50 sequentially performs the replica exchange for the annealing set belonging to the process group 81 in the even number mode. Similarly, the exchange control unit 50 sequentially performs the replica exchange for the annealing set belonging to the process group 82 in the odd number mode.

Thus, the optimization device 25 can perform the replica exchange from the replicas that have completed annealing without waiting for the completion of the search processes of all replicas by performing the pipeline processing with the annealing and the replica exchange being combined. In this manner, latency due to the replica exchange is hidden in the pipeline. Therefore, the calculation by the optimization device 25 can be accelerated.

Furthermore, the pipeline execution of the annealing and the replica exchange of the next process group 82 can be continued without waiting for completion of the annealing and the replica exchange of all replicas in the current process group 81. Thus, the calculation of the optimization device 25 can be further accelerated.

Note that it is also conceivable to divide the replica exchange by the exchange control unit 50 into a plurality of stages (for example, stages corresponding to each of steps S25 to S28 in FIG. 10) to form a pipeline.

Figure 13:
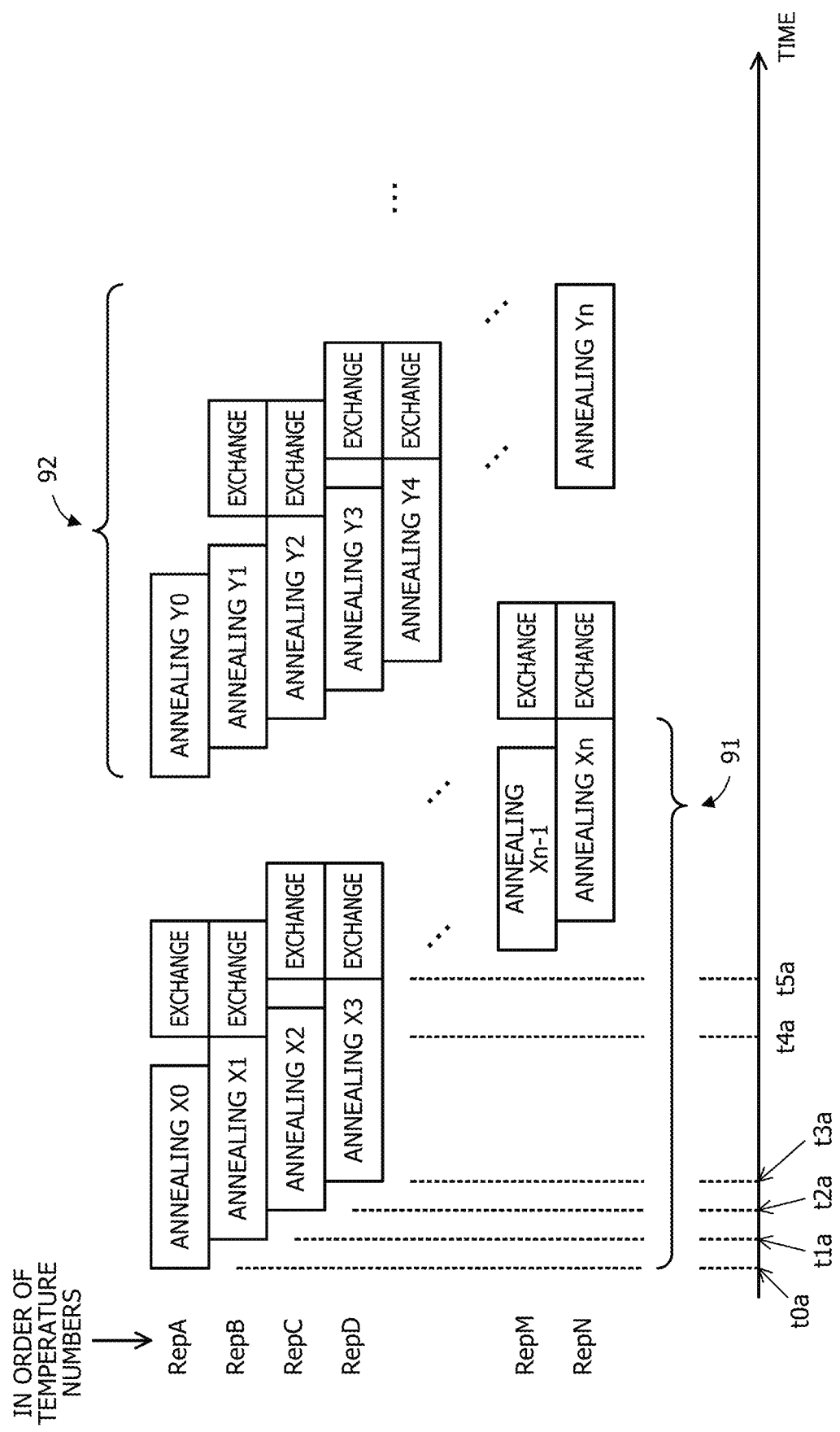
FIG. 13 is a diagram illustrating another example of the pipeline processing.

FIG. 13 is a diagram illustrating another example of the pipeline processing.

The replica numbers arranged in ascending order of temperature numbers are represented as RepA, RepB, RepC, RepD, . . . , RepM, RepN. The replica number substituted into each of RepA, . . . , RepN in a process group 91 may be different from the replica number substituted into each of RepA, . . . , RepN in a process group 92 following the process group 91.

The optimization device 25 may divide the replica exchange process by the exchange control unit 50 into a plurality of stages and perform the following pipeline processing. For example, it is assumed that the replica exchange is divided into a first half stage and a second half stage (however, it may be divided into three or more stages).

The process group 91 includes annealings X0, X1, X2, X3, . . . , Xn-1, Xn performed by each replica in order of temperature numbers. The process group 92 includes annealings Y0, Y1, Y2, Y3, . . . , Yn-1, Yn performed by each replica in order of temperature numbers. The replica exchange for each annealing in the process group 91 is performed in the even number mode. The replica exchange for each annealing in the process group 92 is performed in the odd number mode.

For example, the annealing X0 starts to be executed at time t0a. The annealing X1 starts to be executed at time t1a. For example, time t1a is a time after a predetermined time from time t0a. However, the annealing X1 may be started to be executed at the same time as the annealing X0 (it may be t0a=t1a).

The annealing X2 starts to be executed at time t2a. For example, time t2a is a time after a predetermined time from time t1a. The annealing X3 starts to be executed at time t3a. For example, time t3a is a time after a predetermined time from time t2a. However, the annealing X3 may be started to be executed at the same time as the annealing X2 (it may be t2a=t3a). Thereafter, the annealing is started to be executed in order of temperature numbers.

For example, the annealing X0 completes before time t4a when the annealings X2, X3, . . . are being executed, and annealing X1 completes at time t4a. In other words, at time t4a, the annealings X0, X1 are completed. At time t4a (or immediately after the annealing X1 is completed at time t4a), the exchange control unit 50 starts the first half stage of the replica exchange of the annealing unit of replica number RepA that has executed the annealing X0 with the annealing unit of replica number RepB that has executed the annealing X1. For example, the exchange control unit 50 completes the first half stage of the replica exchange at time t5a, and starts the second half stage of the replica exchange immediately after time t5a.

For example, the annealing X2 is completed before time t5a when the annealing process after the annealing X3 is being executed, and the annealing X3 is completed at time t5a. In other words, at time t5a, the annealings X2, X3 are completed. At time t5a (or immediately after the annealing X3 is completed at time t5a), the exchange control unit 50 starts the first half stage of the replica exchange of the annealing unit of replica number RepC that has executed the annealing X2 with the annealing unit of replica number RepD that has executed the annealing X3.

Thus, the optimization device 25 can also process the replica exchanges in parallel by the pipeline. Thus, the calculation of the optimization device 25 can be still further accelerated.

Figure 14A:
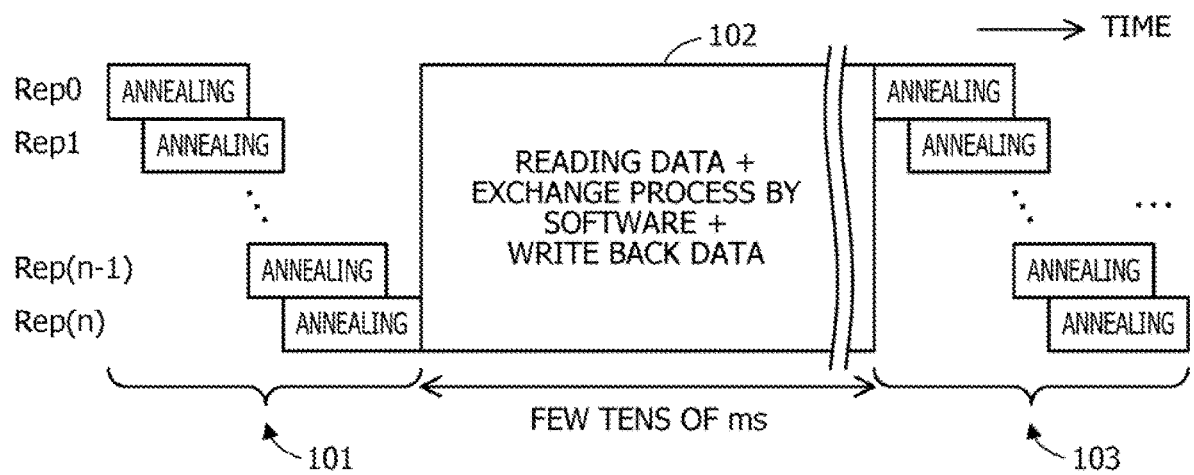
FIGS. 14A and 14B are a diagram illustrating a comparative example.
Figure 14B:
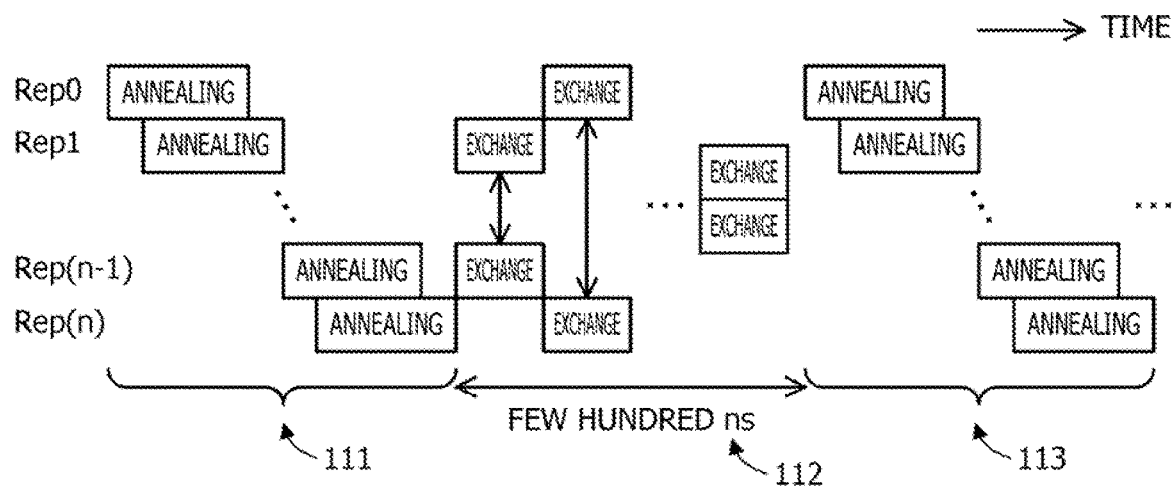

FIGS. 14A and 14B are a diagram illustrating a comparative example.

In FIGS. 14A and 14B, n+1 replicas are considered. It is assumed that the respective replica numbers of the replicas are Rep0, Rep1, . . . , Rep(n−1), Rep(n). Each replica is assigned with a temperature number.

FIG. 14A illustrates a comparative example of replica exchange by software. For example, by executing a program stored in the DRAM 22 by the CPU 21, a replica exchange function of the comparative example can be exhibited. In the comparative example of FIG. 14A, for example, the DRAM 22 retains correspondence information between replica numbers and temperatures.

In the comparative example of FIG. 14A, each replica performs annealing in an arbitrary order (for example, in the order of replica numbers) using temperature information assigned to itself. A process group 101 represents the annealing by each replica of the replica numbers Rep0, . . . , Rep(n). When the process group 101 is completed, the CPU 21 executes an exchange step 102.

Specifically, the CPU 21 reads the energy from each replica and stores it in the DRAM 22, and the replica exchange between replicas to which adjacent temperatures are assigned is performed by the function of the software executed by the CPU 21. The CPU 21 reflects the result of the replica exchange in the correspondence information of the DRAM 22, and writes back the temperature information after the exchange to each replica. Then, when the exchange step 102 is completed, the next process group 103 is started.

In the exchange step 102, the CPU 21 executes the replica exchange. The delay due to the exchange step 102 is about several tens of milliseconds (ms).

FIG. 14B illustrates a comparative example of replica exchange by hardware. A process group 111 represents the annealing by each replica of the replica numbers Rep0, . . . , Rep(n). When the process group 111 is completed, the optimization device of the comparative example executes the exchange step 112 in its own device. In other words, in the comparative example of FIG. 14B, the replica exchange is executed by predetermined hardware (referred to as an exchange circuit) instead of the software executed by the CPU 21 or the like, which is different from the comparative example of FIG. 14A. Also in the comparative example of FIG. 14B, as in the comparative example of FIG. 14A, the exchange circuit retains the correspondence information between the replica numbers and temperatures, and the replica exchange between replicas to which adjacent temperatures are assigned is performed, for example, in order of temperature numbers. The exchange circuit reflects the result of the replica exchange in the correspondence information retained by the exchange circuit, and supplies the temperature information after the exchange to each replica. When the exchange step 112 is complete, a next process group 113 is started.

In the exchange step 112, a predetermined exchange circuit performs the replica exchange. In the exchange step 112, assuming that the number of replicas is N (=n+1), a total of N cycles is needed, Specifically, {(one cycle needed for reading energy from two replicas)+(one cycle needed for writing temperature to two replicas)}×N/2=N cycles. The delay due to the exchange step 112 is about several hundred nanoseconds (ns).

On the other hand, the optimization device 25 can perform the replica exchange from the replica whose search process is completed without waiting for the completion of the search processes of all replicas by performing the pipeline processing with the search process and the replica exchange being combined. In this manner, a delay due to the replica exchange is hidden in the pipeline, Thus, a delay due to the exchange step 102 and the exchange step 112 can be reduced. Therefore, the calculation by the optimization device 25 can be accelerated.

Furthermore, pipeline execution of the annealing and the replica exchange of the next process group can be continued without waiting for completion of the replica exchange of all replicas in the current process group, Thus, the calculation of the optimization device 25 can be further accelerated.

Moreover, in the optimization device 25, it is expected that all replicas change back and forth between the high temperature side and the low temperature side by switching between the even number mode and the odd number mode alternately for every process group, which increases the likelihood of obtaining an appropriate solution.

Figure 15:
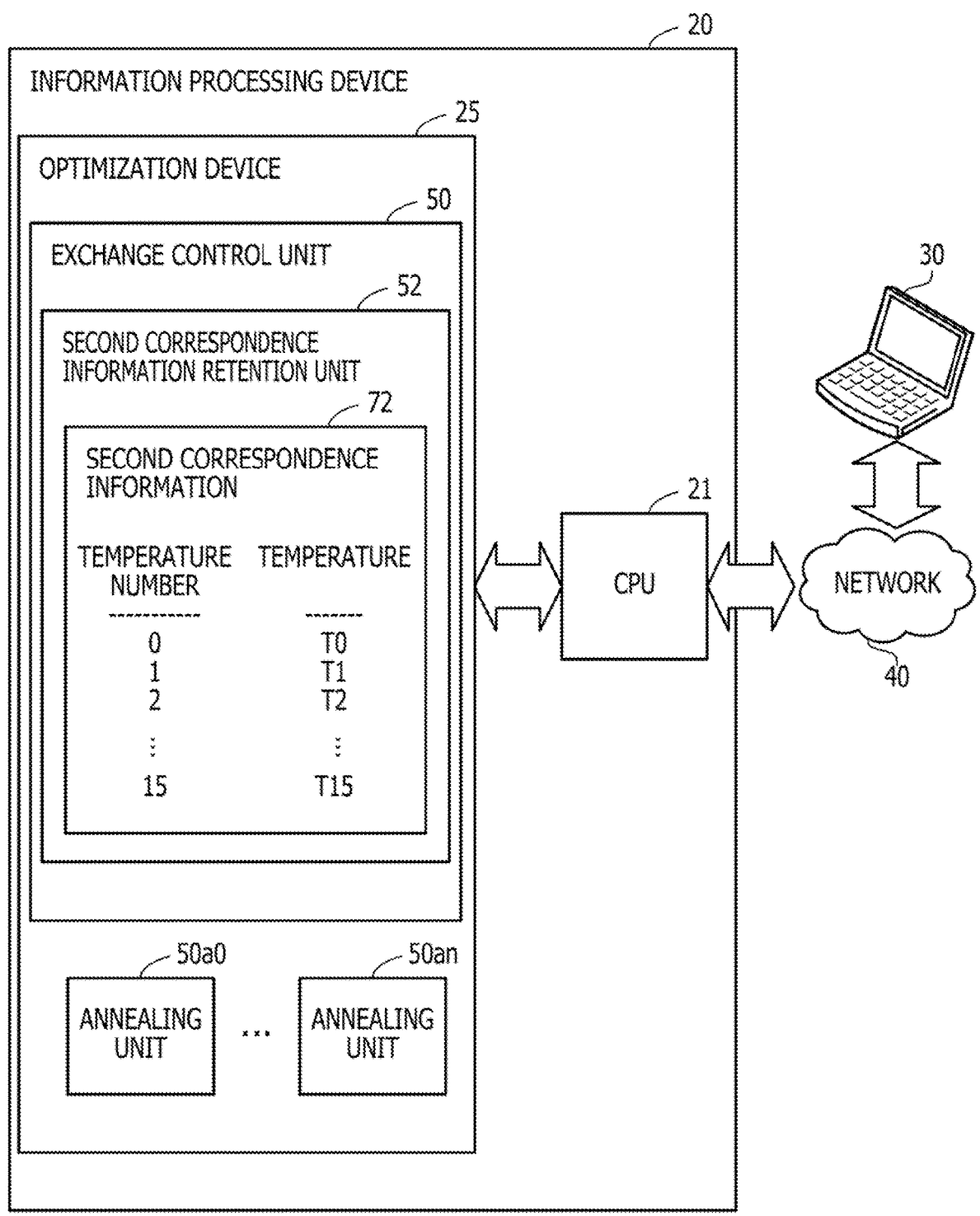
FIG. 15 is a diagram illustrating an example of a system for obtaining an optimum solution.

FIG. 15 is a diagram illustrating an example of a system for obtaining an optimum solution. The user uses the client 30 to input the optimization problem to be solved to the information processing device 20 via the network 40. The information processing device 20 replaces the optimization problem input from the network 40 to the CPU 21 with the Ising model, and searches the ground state of the Ising model, thereby outputting a solution of the optimization problem to be solved. The client 30, the network 40, and the CPU 21 implements an input unit that inputs temperatures and temperature identification information in the optimization device 25, and a notification unit that notifies the user of quality information.

Next, the execution procedure for obtaining an optimum solution will be described.

Figure 16:
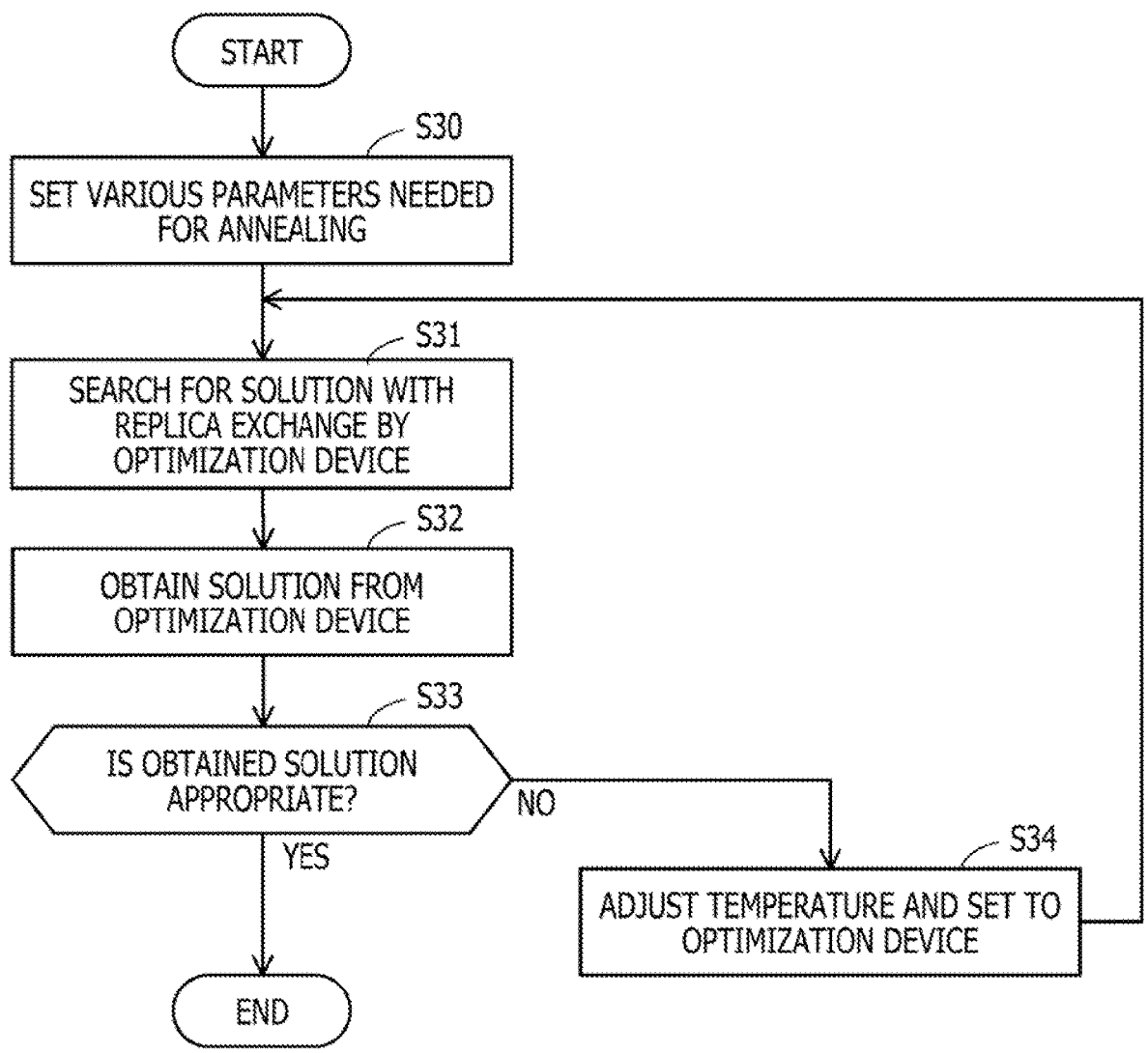
FIG. 16 is a flowchart illustrating an execution example or obtaining an optimum solution.

FIG. 16 is a flowchart illustrating an execution example for obtaining an optimum solution.

(S30) The CPU 21 converts the optimization problem input from the client 30 into the Ising model. The initial spin variables, coupling coefficients, and initial energies generated in the process are input to the annealing units 50a0, . . . , 50an in the optimization device 25. Furthermore, the CPU 21 inputs an initial temperature setting according to the type of the optimization problem to the second correspondence information retention unit 52 in the optimization device 25.

(S31) The optimization device 25 executes the annealing process using the replica exchange method based on the setting input in step S30.

(S32) After the annealing process and the replica exchange process are executed a predetermined iteration count, the CPU 21 notifies the client 30 of the completion of the process. Thereafter, the user requests from the client 30 to the CPU 21 to acquire annealing result data (energy, spin variables) and temperature information. The CPU 21 acquires energy and spin variables from the annealing units 50a0, . . . , 50an and temperature information from the second correspondence information retention unit 52, respectively, and notifies the client 30 of them.

(S33) The CPU 21 compares the result data of the energy acquired in step S32 with a predetermined energy threshold, and inspects whether the quality is sufficient as a solution to the optimization problem. When the energy result data is equal to or less than the predetermined energy threshold, the processing is terminated assuming that the quality is sufficient. When this is not the case, that is, when the energy result data is greater than the predetermined energy threshold, the client 30 is notified that the quality is not sufficient and the process proceeds to step S34.

(S34) The CPU 21 generates a new temperature setting by adjusting the interval between adjacent temperatures with respect to the temperature setting acquired in step S32. The CPU 21 inputs the generated temperature setting to the optimization device in a procedure similar to step S30, and proceeds to step S31 using the same parameters as in the previous annealing process for other parameters.

FIG. 17 is a diagram illustrating an execution example of temperature adjustment in step S34.

The second correspondence information 72 illustrates an initial temperature setting at timing T1 (also illustrates an example of a specific β value), When quality of the solution obtained as a result of the annealing process with this temperature setting is insufficient, that is, when the energy result data is larger than the predetermined energy threshold, the CPU 21 notifies the client 30 that the quality is not sufficient, and changes the temperature in the temperature numbers 1, 5, 11 of the second correspondence information 72, for example. The "=>" symbol in the diagram indicates a change in temperature, the numeric value on the left side of the symbol (for example, "90") is before the change, and the numeric value on the right side (for example, "92") is after the change. Thus, the exchange probabilities between the temperature numbers (0, 1) (1, 2) (4, 5) (5, 6) (10, 11) (11, 12) are adjusted in an attempt to improve the energy result data. The second correspondence information 72a exemplifies the result of changing the temperatures at timing T1.

Nevertheless, when the energy result data is still greater than the predetermined energy threshold and the quality of the solution is insufficient, the CPU 21 further notifies the client 30 that the quality is not sufficient at timing T2 and changes the temperatures at the temperature numbers 4, 6, 12 of the second correspondence information 72a, for example. Thus, the exchange probabilities between the temperature numbers (3, 4) (4, 5) (5, 6) (6, 7) (11, 12) (12, 13) are adjusted in an attempt to improve the energy result data. By repeating such processing, it is possible to obtain a temperature setting suitable for every optimization problem to be solved. As a consequence, a solution of sufficient quality can be obtained.

Note that the control of the optimization device 10 according to the first embodiment may be implemented by executing a program by a processor included in the computer that controls the optimization device 10. For example, the program is stored in the RAM of the computer. The control of the optimization device 25 according to the second embodiment may be implemented by causing the CPU 21 to execute a program. The program can be recorded in the computer-readable recording medium 41.

For example, the program can be distributed by distributing the recording medium 41 in which the program is recorded. Furthermore, the program may be stored in another computer and distributed via a network. For example, a computer may store (install) the program, which is recorded in the recording medium 41 or received from another computer, in the DRAM 22 or the storage device 23, read the program from the DRAM 22 or the storage device 23, and execute the program.

The above description merely describes the principle of the present invention. Moreover, numerous modifications and variations can be made by those skilled in the art, and the present invention is not limited to the above-described or illustrated exact configuration and application example, and all corresponding modifications and equivalents are regarded to fall within the scope of the present invention by appended claims and equivalents thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optimization device comprising:
   a memory; and
   a processor coupled to the memory and configured to:
   perform, as a plurality of annealing operations, a search process including, with respect to a change in a value of any of a plurality of state variables included in an evaluation function representing an energy, based on a change in the energy accompanying a change in a value of each of the plurality of state variables and a temperature, probabilistically determining which change of value of the plurality of state variables is accepted, and determining a value of each of the plurality of state variables with respect to the temperature;
   retain correspondence information in which a plurality of pieces of identification information that identifies the plurality of annealing operations is arranged in ascending or descending order of the temperature assigned to each of the plurality of annealing operations;
   determine a plurality of first pairs of two annealing operations having two temperatures based on the correspondence information;

cause start of the search process by each of the annealing operations associated with the temperature in the order of the temperature;

perform a pipeline process including determining whether to perform, when the search processes by one first pair of the plurality of first pairs corresponding to the two temperatures are completed, exchange of the temperatures assigned to the one first pair without waiting for completion of the search processes by one or more first pairs other than the one first pair and exchanging the two temperatures of the two annealing operations of the one first pair;

update the correspondence information when performing the exchange; and supply temperature information representing the temperatures to the two annealing operations based on the correspondence information after the update.

2. The optimization device according to claim 1, wherein the processor determines, for a current search process by each of the plurality of annealing operations, whether or not to perform the exchange of the temperatures each of the plurality of first pairs, and determines, for a next search process by each of the plurality of annealing operations, whether or not to perform the exchange of the temperatures for a plurality of second pairs different from the plurality of first pairs.

3. The optimization device according to claim 1, wherein after determining whether or not to perform the exchange of the temperatures assigned to the first pair, the processor causes start of the search process by the two annealing operations of the one pair based on the correspondence information without waiting for completion of the search processes by the one or more first pairs other than the one first pair.

4. The optimization device according to claim 1, wherein when performing the exchange of the temperatures, the processor updates the correspondence information by exchanging the respective pieces of identification information of the two annealing operations associated with the two temperatures.

5. The optimization device according to claim 4, wherein when performing the exchange of the temperatures, the processor updates the correspondence information by exchanging the respective pieces of identification information of the two annealing operations associated with two adjacent temperatures in the correspondence information.

6. The optimization device according to claim 1, wherein the temperature in the correspondence information is represented by temperature identification information that identifies the temperature, and the processor retains another correspondence information indicating a correspondence relationship between the temperature and the temperature identification information, and converts the temperature identification information corresponding to the identification information of each of the plurality of annealing operations into the temperature based on the other correspondence information.

7. The optimization device according to claim 1, wherein the processor inputs the temperature, which is retained in the memory, and the temperature identification information that identifies the temperature.

8. The optimization device according to claim 1, wherein the processor gives a notification that quality is not sufficient when result data of energy after the processes by the plurality of annealing operations is larger than a predetermined energy threshold.

9. A method of controlling an optimization device that includes a plurality of annealing operations each that performs a process including, with respect to a change in a value of any of a plurality of state variables included in an evaluation function representing an energy, based on a change in the energy accompanying a change in a value of each of the plurality of state variables and a temperature, probabilistically determining which change of value of the plurality of state variables is accepted, and determining a value of each of the plurality of state variables with respect to the temperature, the method comprising:

retaining correspondence information in which a plurality of pieces of identification information that identifies the plurality of annealing operations is arranged in ascending or descending order of the temperature assigned to each of the plurality of annealing operations;

determining a plurality of first pairs of two annealing operations having two temperatures based on the correspondence information;

causing start of the search process by each of the annealing operations associated with the temperature in the order of the temperature;

performing a pipeline process including determining whether to perform, when the search processes by one first pair of the plurality of first pairs corresponding to the two temperatures are completed, exchange of the temperatures assigned to the one first pair without waiting for completion of the search processes by one or more first pairs other than the one first pair and exchanging the two temperatures of the two annealing operations of the one first pair;

updating the correspondence information when performing the exchange; and supplying temperature information representing the temperatures to the two annealing operations based on the correspondence information after the update.

10. A non-transitory computer-readable recording medium recording a program for controlling an optimization device that includes a plurality of annealing operations each that performs a process including, with respect to a change in a value of any of a plurality of state variables included in an evaluation function representing an energy, based on a change in the energy accompanying a change in a value of each of the plurality of state variables and a temperature, probabilistically determining which change of value of the plurality of state variables is accepted, and determining a value of each of the plurality of state variables with respect to the temperature, the program causing a computer to:

retain correspondence information in which a plurality of pieces of identification information that identifies the plurality of annealing operations is arranged in ascending or descending order of the temperature assigned to each of the plurality of annealing operations;

determine a plurality of first pairs of two annealing operations having two temperatures based on the correspondence information;

cause start of the search process by each of the annealing operations associated with the temperature in the order of the temperature;

perform a pipeline process including determining whether to perform, when the search processes by one first pair of the plurality of first pairs corresponding to the two temperatures are completed, exchange of the temperatures assigned to the one first pair without waiting for completion of the search processes by one or more first pairs other than the one first pair and exchanging the two temperatures of the two annealing operations of the one first pair;

update the correspondence information when performing the exchange; and supply temperature information representing the temperatures to the two annealing operations based on the correspondence information after the update.

\* \* \* \* \*